United States Patent
Inoue et al.

(10) Patent No.: US 6,332,024 B1
(45) Date of Patent: Dec. 18, 2001

(54) PORTABLE TERMINAL

(75) Inventors: Katsuo Inoue; Tomoaki Tsukada; Kensei Ito; Satoshi Okamoto, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/403,189

(22) PCT Filed: Jan. 29, 1999

(86) PCT No.: PCT/JP99/00387

§ 371 Date: Oct. 19, 1999

§ 102(e) Date: Oct. 19, 1999

(87) PCT Pub. No.: WO99/45459

PCT Pub. Date: Sep. 10, 1999

(30) Foreign Application Priority Data

Mar. 5, 1998 (JP) .................................................. 10-53640

(51) Int. Cl.⁷ ...................................................... H04M 1/00
(52) U.S. Cl. ................................. 379/433.06; 379/433.04
(58) Field of Search .................................... 379/433, 368, 379/369, 370, 355; 455/575, 90

(56) References Cited

U.S. PATENT DOCUMENTS 5,987,336 * 11/1999 Sudo et al. ............................ 455/575

FOREIGN PATENT DOCUMENTS

| | | |
|---|---|---|
| 53-25317 | 3/1978 | (JP) . |
| 61-246832 | 11/1986 | (JP) . |
| 61-248087 | 11/1986 | (JP) . |
| 3-116450 | 12/1991 | (JP) . |
| 4338861 | 11/1992 | (JP) . |
| 5-341893 | 12/1993 | (JP) . |
| 7297891 | 11/1995 | (JP) . |
| 879360 | 3/1996 | (JP) . |
| 9-34620 | 2/1997 | (JP) . |
| 9261758 | 10/1997 | (JP) . |
| 9261759 | 10/1997 | (JP) . |
| 9321839 | 12/1997 | (JP) . |
| 1028167 | 1/1998 | (JP) . |
| 10-31541 | 2/1998 | (JP) . |

* cited by examiner

*Primary Examiner*—Jack Chiang
(74) *Attorney, Agent, or Firm*—Rothwell, Figg, Ernst & Manbeck

(57) ABSTRACT

A portable terminal comprises a LCD display screen (2) located on a control surface of a case for displaying thereon information according to the communication mode; a main soft key (3) located below the LCD display screen (2) with which can be rotated in a direction towards or away from the display screen as well as can be pressed; and first auxiliary soft key (4A) and second auxiliary soft key (4B) located on the two sides of the main soft key (3) which can be pressed. In this portable terminal, for each communication mode, function having the highest frequency of use is allocated to the main soft key (3) mode and functions having the next highest frequency of use are allocated to the first auxiliary soft key (4A) and second auxiliary soft key (4B). Further, marks representing the allocated functions are displayed on the LCD display screen (2) near the positions of the main soft key and the first auxiliary soft key (4A) and a second auxiliary soft key (4B) as main-function icon and auxiliary-function icon respectively.

14 Claims, 18 Drawing Sheets

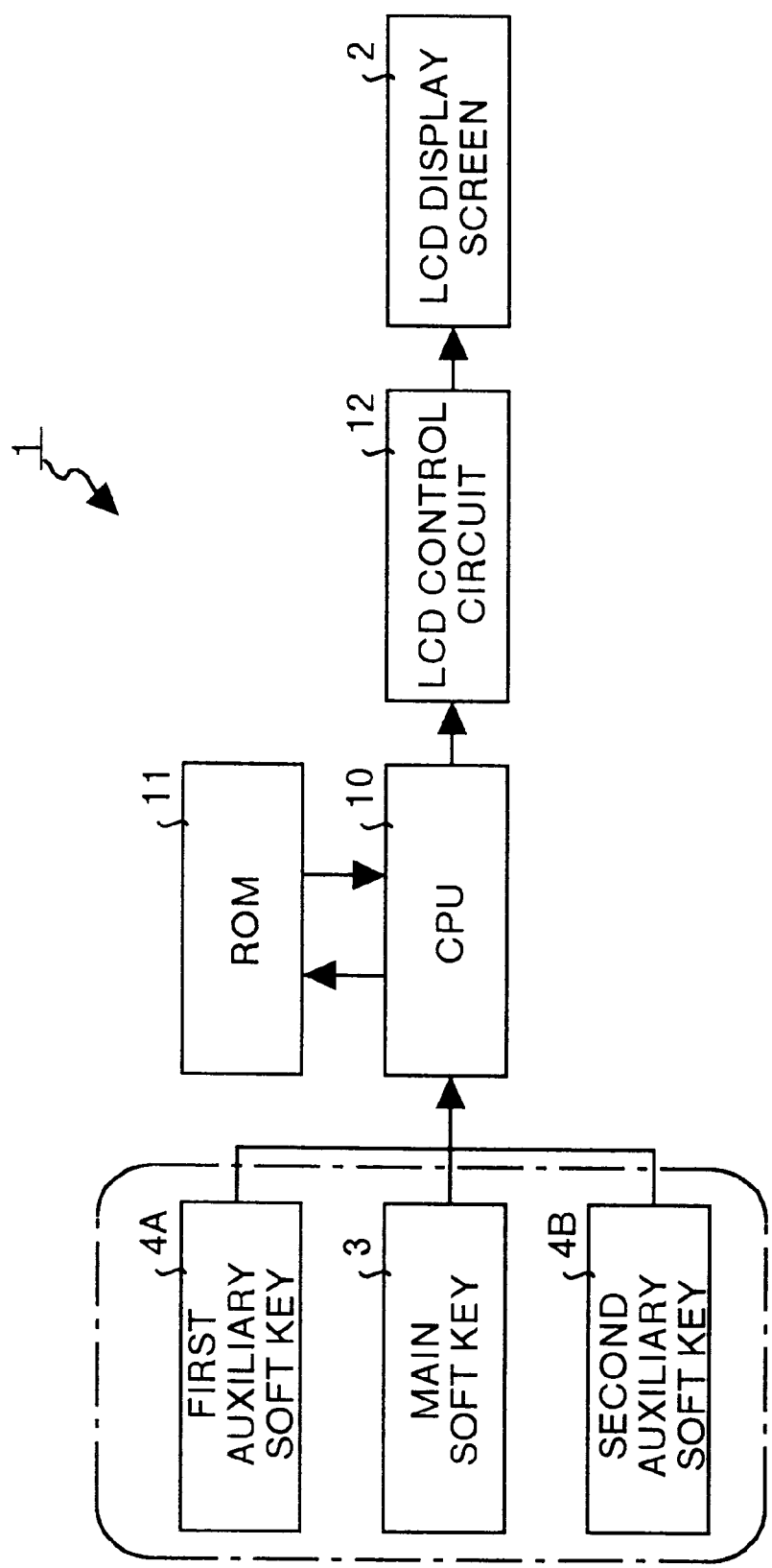

DIAL 1 (SOFT KEY IN INITIAL MODE A0)

DIAL 4 (SOFT KEY IN MODE A3)

DIAL 2 (SOFT KEY IN MODE A1)

DIAL 5 (SOFT KEY IN MODE A4)

DIAL 3 (SOFY KEY IN MODE A2)

DIRECTORY 1
(SOFT KEY IN INITIAL MODE B0)

DIRECTORY 3
(SOFT KEY IN MODE B2)

DIRECTORY 2
(SOFT KEY IN MODE B1)

DIRECTORY 4
(SOFT KEY IN MODE B3)

REGISTRATION 1
(SOFT KEY IN INITIAL MODE C0)

REGISTRATION 2
(SOFT KEY IN MODE C1)

REGISTRATION 3
(SOFT KEY IN MODE C2)

REGISTRATION 4
(SOFT KEY IN MODE C3)

REGISTRATION 5
(SOFT KEY IN MODE C4)

REGISTRATION 6
(SOFT KEY IN MODE C5)

REGISTRATION 7
(SOFT KEY IN MODE C6)

REGISTRATION 8
(SOFT KEY IN MODE C7)

(A) CHARACTER ENTRY 1
(SOFT KEY IN INITIAL MODE D 0)

(B) CHARACTER ENTRY 2
(SOFT KEY IN MODE D 1)

(C) CHARACTER ENTRY 3
(SOFT KEY IN MODE D 2)

MAIL 1
(SOFT KEY IN MODE E0)

MAIL 2
(SOFT KEY IN MODE E1)

MAIL 3
(SOFT KEY IN MODE E2)

MAIL 4
(SOFT KEY IN MODE E3)

MAIL 5
(SOFT KEY IN MODE E4)

MAIL 6
(SOFT KEY IN MODE E5)

MAIL 7
(SOFT KEY IN MODE E6)

TRANSMISSION
(SOFT KEY IN MODE F0)

RECEPTION
(SOFT KEY IN MODE F1)

RECEPTION
(SOFT KEY IN MODE F2)

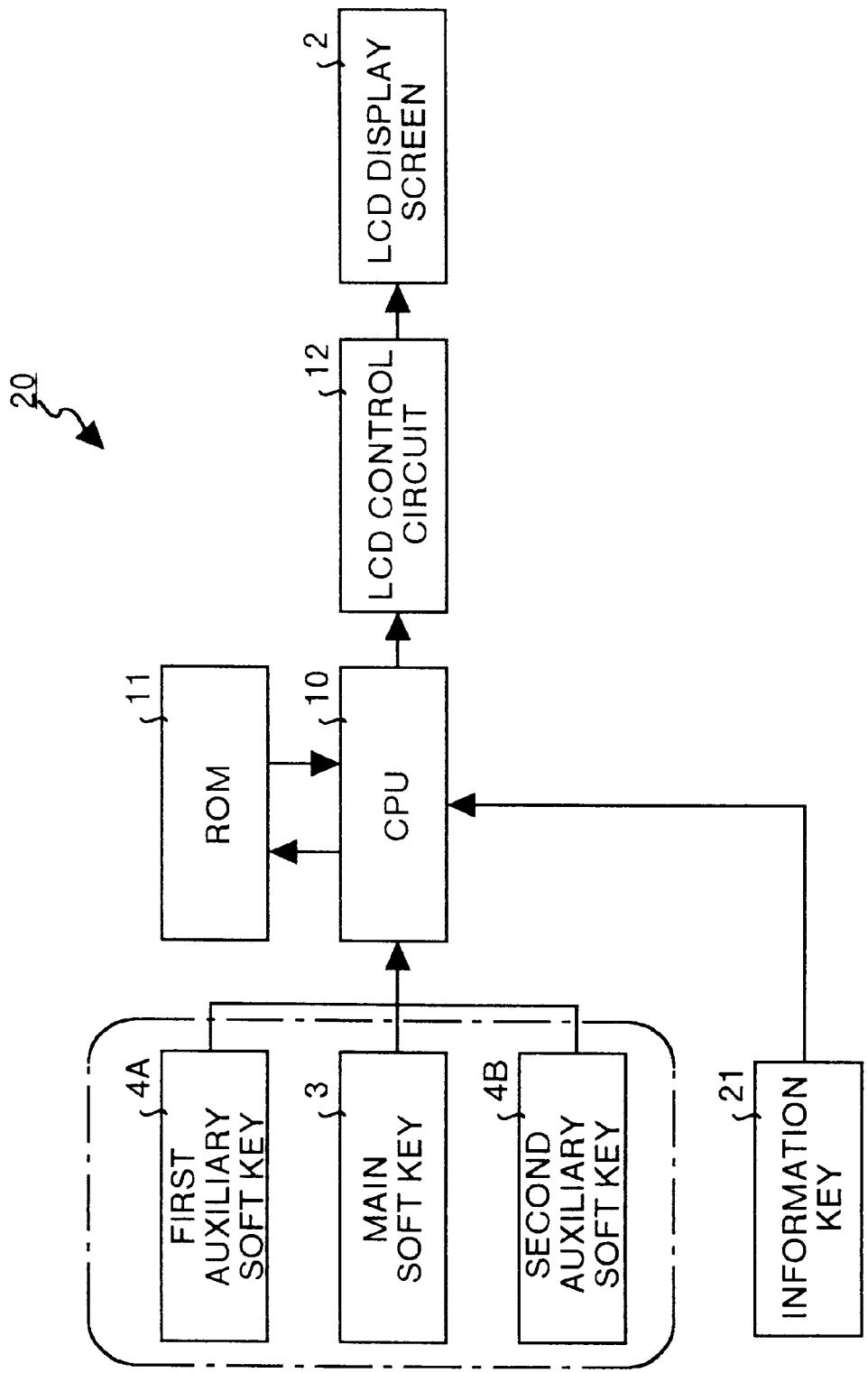

INTERNET 1
(SOFT KEY IN INITIAL MODE G0)

INTERNET 4
(SOFT KEY IN MODE G3)

INTERNET 2
(SOFT KEY IN MODE G1)

INTERNET 5
(SOFT KEY IN MODE G4)

INTERNET 3
(SOFT KEY IN MODE G2)

INTERNET 6
(SOFT KEY IN MODE G5)

(A) INTERNET 7
(SOFT KEY IN MODE G6)

(D) INTERNET 10
(SOFT KEY IN MODE G9)

(B) INTERNET 8
(SOFT KEY IN MODE G7)

(E) INTERNET 11
(SOFT KEY IN MODE G10)

(C) INTERNET 9
(SOFT KEY IN MODE G8)

(F) INTERNET 12
(SOFT KEY IN MODE G11)

PORTABLE TERMINAL

TECHNOLOGICAL FIELDS

The present invention relates to a portable terminal, and more specifically to a portable telecommunication terminal applicable, for instance, to a mobile telephone.

BACKGROUND TECHNOLOGY

Mobile telephones having functions for entering and registering telephone numbers and names of parties or the like, and function for retrieving information from the registered directory lists, and function for creating and retrieving personal information as well as schedule and electronic mails (email) are known. Generally, an input device such as a ten-key or the input device disclosed in Japanese Patent Laid-Open Publication No. HEI 9-34620 is used for registering information in the above mentioned directory list, personal information, schedule, or email. Further, selection means disclosed in Japanese Patent Laid-Open Publication No. HEI 7-297891 may be used for selecting any one of the plurality parties already registered in the directory list or the like.

Weight and size of the mobile telephone is decreasing, while the functions provided therein are increasing day by day. Considering this fact, the mobile telephone is getting short of space for incorporating therein the input device and the various types of function keys or the like. From the ergonomic point of view, it is disadvantageous to arrange a large number of input devices in a small space, because such an arrangement worsens the operability of the mobile telephone. In order to overcome this disadvantage due to a small space, allocating multiple functions to one input device may be considered. However, when multiple functions are allocated to one input device, the user is required to memorize all the functions allocated to the input device so that the load on the user increases. Further, from the psychological pressure due to remembering the information, the operational procedure becomes complicated. Further, now a days it is common for the mobile telephones to incorporate means for inputting characters for writing an email. However, the method of inputting the characters in the conventional mobile telephone is very complicated.

The present invention has been made for solving the problems described above, and it is an object of the present invention to provide a portable terminal which can realize versatility and downsizing by utilizing minimum entry keys and significantly improve the usability.

DISCLOSURE OF THE INVENTION

A portable terminal according to the present invention comprises, a case having a control panel surface; a display screen located on the control panel surface of the case for displaying thereon information according to a communication mode; a main soft key located below the display screen, with which main soft key a rotating operation as well as a pressing operation can be performed; and an auxiliary soft key located by the side of the main soft key, with which auxiliary soft key a pressing operation can be performed; wherein a function having the highest frequency of use is allocated to the main soft key for each communication mode and a function having a higher frequency of use is allocated to the auxiliary soft key, and marks representing the functions allocated to the main and auxiliary soft keys are displayed near the respective keys as a main-function icon and an auxiliary-function icon respectively on the display screen.

In the portable terminal described above, one main soft key and one auxiliary soft key is provided. Further, marks representing the functions allocated to the main and the auxiliary soft keys are displayed near the main soft key and the auxiliary soft key respectively on the display screen as a main-function icon and an auxiliary function icon. Therefore, number of required entry keys can be reduced. In addition, operation can be performed while looking at the instructions on the display screen without taking help of manuals, so that operability of the device is improved because of the operation of the input device (main soft key, auxiliary soft key) which is linked to a sense obtained when a scrolling operation is performed on a screen.

In the portable terminal according to another aspect of the present invention, a plurality of icons each having a different function are displayed as the main-function icon, any one of these icons is selected by rotating the main soft key and the selected icon is confirmed by pressing the main soft key.

In the portable terminal described above, a plurality of icons are displayed on the display screen as the main-function icon, and one of these icons can be selected and confirmed by rotating and pressing the main soft key, so that operability of the device is further improved.

The portable terminal according to another aspect of the present invention comprises a ten-key and a power key located below the main soft key and the auxiliary soft key on the control panel surface; and a flip having a size equivalent to the size of the ten-key and the power key which flip covers the ten-key and the power key, wherein ordinary operations are carried out using the main soft key or the auxiliary soft key while the flip is in a closed state.

In the portable terminal described above, the main soft key and the auxiliary soft key are generally operated while keeping the flip closed. Therefore, inconvenience of entering data with ten-key or the like can be eliminated.

The portable terminal according to another aspect of the present invention comprises two the auxiliary soft keys of a first auxiliary soft key and a second auxiliary soft key; wherein functions are selected using the main soft key and the first and second auxiliary soft keys.

In the portable terminal described above, functions can be operated by two auxiliary soft keys of the first auxiliary soft key and the second auxiliary soft key, so that more functions can be allocated to these first and second auxiliary soft keys.

The portable terminal according to another aspect of the present invention comprises a substantially cylindrical soft key provided in place of the main soft key and the first and second auxiliary soft keys, which cylindrical soft key is rotatably located below the display screen, the cylindrical soft key having a rotatable main soft key element which performs switching in response to pressing of the central section thereof, which main soft key element corresponds to the main soft key; and first and second auxiliary soft key elements each performing switching in response to pressing of the two edges of the cylindrical soft key, which first and second soft key elements corresponds to the first and second auxiliary soft keys respectively.

In the portable terminal described above, the functions of the above described main soft key and the first and second auxiliary soft keys are allocated to a single soft key. Therefore, the operability is further enhanced and the usability is significantly improved.

The portable terminal according to another aspect of the present invention comprises a one-touch key used for one-touch operation when the portable terminal is to be connected to the Internet; wherein when the portable terminal is connected to the Internet, a function having the highest frequency of use is allocated to the main soft key and a function having a higher frequency of use is allocated to the auxiliary soft key, and the functions allocated to the main and auxiliary soft keys are displayed near the respective keys as a main-function icon and an auxiliary-function icon respectively on the display screen.

In the portable terminal described above, connection to the Internet can be achieved instantly by pressing the one-touch key. When the portable terminal in connected to the Internet, a function having the highest frequency of use is allocated to the main soft key so that this function can be selected by operating the main soft key. Further, a function having the next highest frequency of use is allocated to the auxiliary soft so that this function can be selected by operating the auxiliary soft key. Thus, most commonly used function can be selected with a very simple operation.

In the portable terminal according to another aspect of the present invention, a plurality of browser icons each having a different browser function are displayed on the display screen when the portable terminal is connected to the Internet, and an arbitrary icon from these plurality of browser icons can be selected by operating any of the main soft key, or the first and second auxiliary soft keys.

In the portable terminal described above, a plurality of browser icons are displayed on the display screen when the portable terminal in connected to the Internet. An arbitrary icon out of the plurality of browser icons can be selected by a simple operation of the main soft key, or the first and second auxiliary soft keys.

In the portable terminal according to another aspect of the present invention, a plurality of items are displayed on the display screen when a specified operation is performed using the main soft key and the auxiliary soft key, and an arbitrary item from these plurality of items can be selected by rotating operation of the main soft key.

In the portable terminal described above, a plurality of items are displayed on the display screen when a specified operation is performed using the main soft key and the auxiliary soft key and one item can be selected by operating the main soft key. Thus, a user can select an arbitrary item by a simple operation of the main soft key and auxiliary soft key while checking the screen display.

The portable terminal according to another aspect of the resent invention comprises a case having a control panel surface; a display screen located on the control panel surface of the case for displaying thereon information according to a communication mode; a substantially cylindrical soft key rotatably located below the display screen, which cylindrical soft key having a rotatable main soft key element which performs switching in response to pressing of the central section thereof; and first and second auxiliary soft key elements each performing switching in response to pressing of the two edges of the cylindrical soft key, wherein function allocated to the main soft key element and the first and second auxiliary soft keys elements are displayed near the respective elements as a main-function icon and first and second auxiliary function icons respectively in the lower portion on the display screen, and any of the main-function icon, or the first and second auxiliary-function icons can be selected by operating the cylindrical main soft key.

In the portable terminal described above, a single soft key having a main soft key element and first and second soft key element each having a different function is provided. Further, marks representing the functions allocated to the main soft key element and the first and second auxiliary soft keys elements are displayed near the main soft key element and the first and second auxiliary soft keys elements respectively on the display screen as a main-function icon and an auxiliary function icon. Therefore, number of required entry keys can be reduced, and because it is possible to operate the terminal with a signal soft key operability is significantly improved.

BRIEF DESCRIPTION OF THE DRAWINGS

FIG. 2 is a block diagram showing electrical configuration of the key section of the mobile telephone 1 shown in FIG. 1;

FIG. 11 is a block diagram showing electrical configuration of the key section of the mobile telephone 20 shown in FIG. 10;

BEST MODE FOR CARRYING OUT THE INVENTION

The present invention is described in detail below with reference to the attached drawings.

Figure 1A:
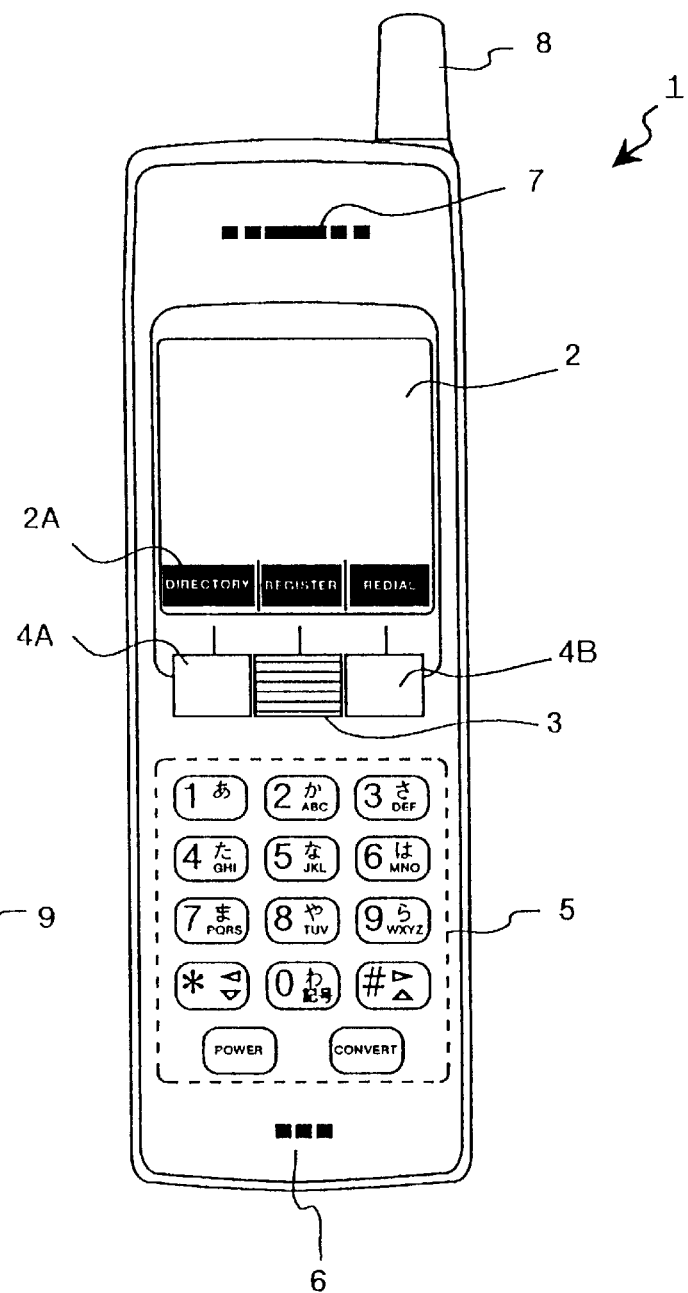
FIG. 1 is a general plan view showing appearance of a mobile telephone 1 which is the portable terminal according to Embodiment 1 of the present invention.
Figure 1B:
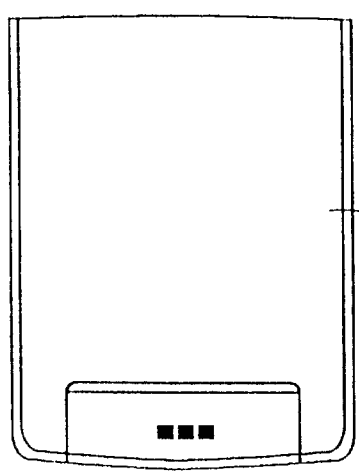

FIG. 1 is a plan view showing external configuration of the mobile telephone 1 as an example of the portable terminal according to Embodiment 1 of the present invention. As shown in this figure, an LCD (Liquid Crystal Display) display screen 2 is located on the top flat panel of a case for the mobile telephone 1. A specified frame appears on this LCD display screen 2 according to the modes in the mobile telephone 1. A main soft key 3 is located below this LCD display screen 2, and a first auxiliary soft key 4A and a second auxiliary soft key 4B are located on the two sides of the main soft key 3 respectively as operation keys. The main soft key 3 can be operated by the key rotating up or down and pressing it in the same way as clicking a mouse button of a computer. The first auxiliary soft key 4A and second auxiliary soft key 4B are operated by just pressing them.

Arranged below the main soft key 3, the first auxiliary soft key 4A and the second auxiliary soft key 4B are ten-key and power/confirm key group 5 utilized for entry of numerals, English characters and Japanese Kana characters. A microphone 6 is provided below this ten-key and power/confirm key group 5. It should be noted that a speaker 7 is provided above the LCD display screen 2, and antenna 8 is provided at the edge section of the top edge surface of the case. Thus, this mobile telephone 1 enables making of a traditional telephone call using the microphone 6 and the speaker 7.

Herein, the soft keys as the main soft key 3, first auxiliary soft key 4A and second auxiliary soft key 4B are the keys whose functions change according to a set situation. The successively changing functions of these keys are displayed in a soft-key function display area 2A provided in the lower portion of the LCD display screen 2. This soft-key function display area 2A is provided right above the location of the main soft key 3, the first auxiliary soft key 4A and the second auxiliary soft key 4B. This allows the user to easily grasp the current functions allocated to the main soft key 3, the first auxiliary soft key 4A and the second auxiliary soft key 4B. Expressions corresponding to the main soft key 3, first auxiliary soft key 4A and second auxiliary soft key 4B appearing in the soft-key function display area 2A are displayed so as to recognize priorities assigned thereto visually with a blink of a position indicator or with color.

In this mobile telephone 1, a flip 9 rotatably attached through a hinge to the lower section of the case covers the ten-key and power/confirm key group 5. Therefore, only the main soft key 3, the first auxiliary soft key 4A and the second auxiliary soft key 4B are visible from the user when using the mobile telephone 1 in a traditional manner. Thus, a designing effect can significantly be improved because only a smaller number of keys are arranged on the control surface. Even if multiple functions are provided in the mobile telephone 1, the most of operations can be realized utilizing the soft key 3, the first auxiliary soft key 4A, and the second auxiliary soft key 4B which are visible all the time. This allows the usability for a user to significantly be improved.

FIG. 2 is a block diagram showing electrical configuration of the key section of the mobile telephone 1 shown in FIG. 1. In the figure, the same reference numerals are assigned to the sections corresponding to those in FIG. 1. In FIG. 2, a CPU (Central Processing Unit) 10 provides various controls such as display control and communication control in response to the operations performed utilizing the main soft key 3, the first auxiliary soft key 4A, and the second auxiliary soft key 4B. The operation of the CPU 10 is described in detail later. A ROM (Read Only Memory) 11 stores therein computer programs executed in the CPU 10.

Accordingly, the CPU 10 provides various controls such as display control and communication control based on these computer programs.

An LCD control circuit 12 provides controls for driving the LCD display screen 2, and controls the display on the LCD display screen 2 by receiving commands from the CPU 10. It should be noted that a transmitter/receiver section (not shown herein) for performing communications with a radio base station not shown herein through the antenna 8 (Refer to FIG. 1) is provided in the mobile telephone 1. This radio communication section performs data transaction such as audio data and text data under the control by the CPU 10.

Figure 3:
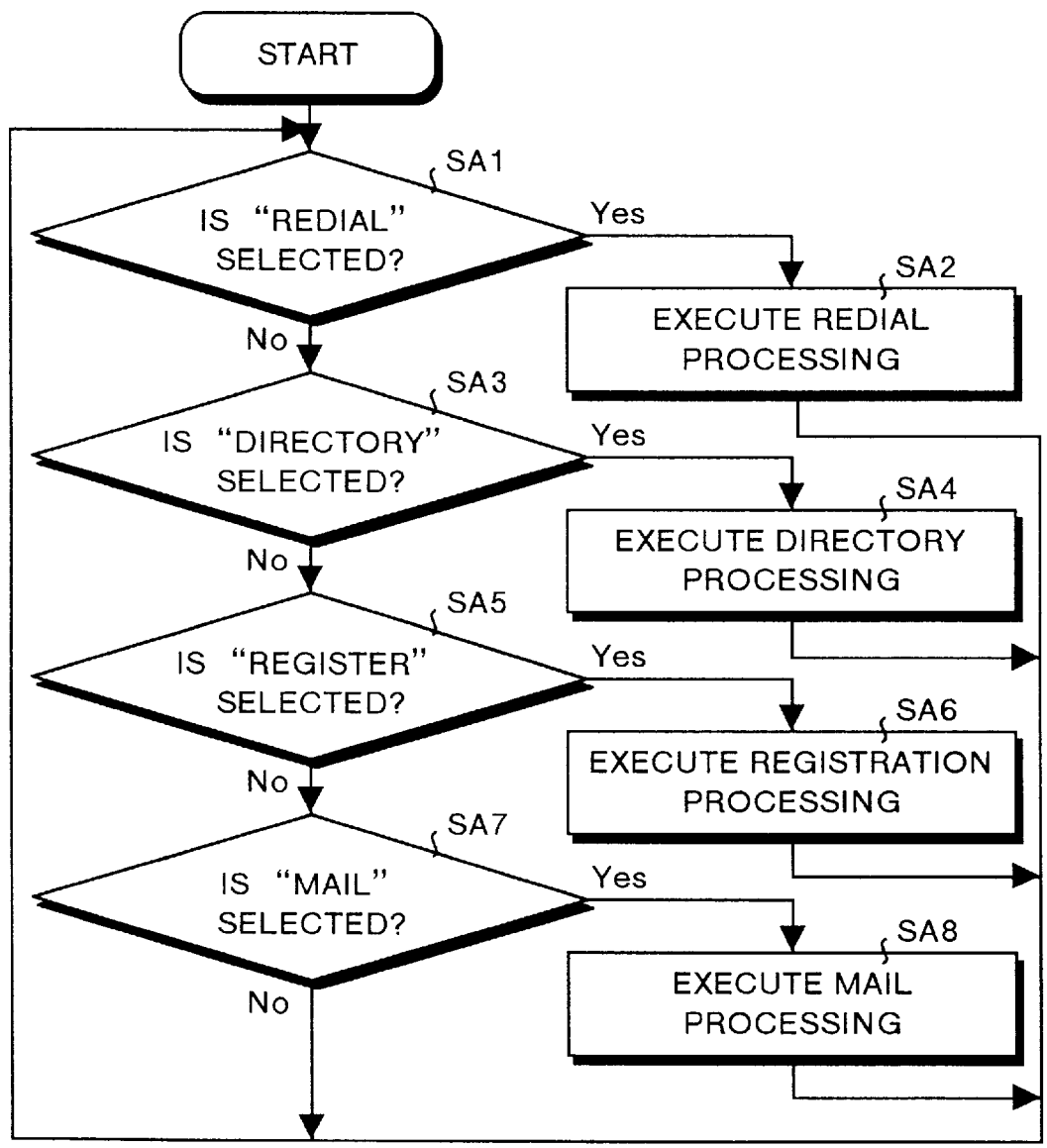
FIG. 3 is a flow chart for explaining a main operations of the mobile telephone 1 shown in FIG. 1.

Main operations of the mobile telephone 1 are described here while referring to the flow chart shown in FIG. 3. When power of the mobile telephone 1 shown in FIG. 1 is turned ON, a screen showing an initial mode A0 appears in the soft-key function display area 2A of the LCD display screen 2 as shown in FIG. 4 (A). In this initial mode A0, icons $I_{A00}$, $I_{A01}$, $I_{A02}$ showing "Register, Mail", "Menu" respectively are vertically arranged and displayed as functions corresponding to the main soft key 3 in the soft-key function display area 2A, and also icons $I_{A03}$, $I_{A04}$ showing "Directory" and "Redial" respectively as functions corresponding to the first auxiliary soft key 4A and the second auxiliary soft key 4B respectively are arranged and displayed on the two sides of the icon $I_{A00}$ showing "Register".

Figure 4A:
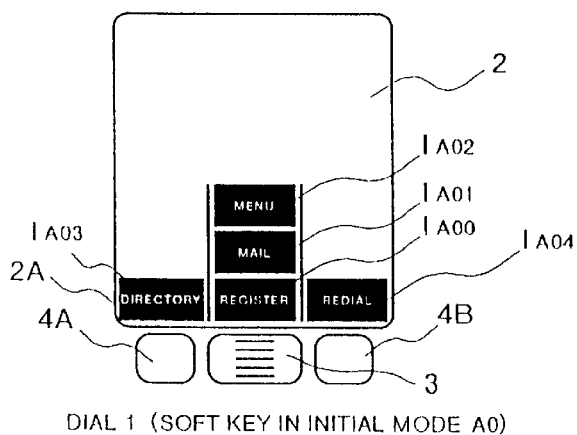
FIG. 4 explains a correlation between a display screen and soft keys in a redial processing in the mobile telephone 1 shown in FIG. 1.

In this condition, the CPU 10 (Refer to FIG. 2) proceeds the system control to step SA1 shown in FIG. 3, and determines whether "Redial" function (Icon $I_{A04}$) shown in FIG. 4(A) is selected or not. More specifically, the CPU 10 determines whether the second auxiliary soft key 4B corresponding to the "Redial" function is pressed by the user or not, and shifts the system control to step SA2 when a result of determination is affirmative. In the step SA2, the CPU 10 executes a redial processing in which a telephone call is made to a telephone number from which a telephone call has been received in the past, and then returns the system control to step SA1. This redial processing will be explained in detail later.

When the result of determination in step SA1 is negative, the CPU 10 shifts the system control to step SA3 and determines whether the "Directory" function (Icon $I_{A03}$) is selected or not. More specifically, the CPU 10 determines whether the first auxiliary soft key 4A corresponding to the "Directory" function is pressed by the user or not, and shifts the system control to step SA4 when the result of determination is affirmative. In the step SA4, the CPU 10 executes the directory processing in which a search for information like names, types of telephones, telephone numbers each previously registered in a director by the user are searched or a telephone call is made according to the result of the search, and then the system control is again returned to step SA1. This directory processing will be explained in detail later.

When the result of determination in step SA3 is negative, the CPU 10 shifts the system control to step SA5 and determines whether the "Register" function (Icon $I_{A00}$) shown in FIG. 4(A) is selected or not. More specifically, the CPU 10 determines whether the main soft key 3 is rotated in a downward direction in the figure and then pressed or not, and shifts the system control to step SA6 when the result of determination in step SA5 is affirmative. In step SA6, the CPU 10 executes the registration processing in which data such as name(s), telephone number(s), or email address(es) is newly registered or the existing data is corrected, and then the system control is returned again to step SA1. This registration processing will be explained in detail later.

When the result of determination in step SA5 is negative, the CPU 10 shifts the system control to step SA7 and determines whether the "Mail" function (Icon $I_{A01}$) shown in FIG. 4(A) is selected or not. More specifically, the CPU 10 determines from the pressure applied to the main soft key 3 by the user whether the "Mail" (Icon $I_{A01}$) shown in FIG. 4(A) is selected or not. When the result of determination in step SA7 is affirmative, the CPU 10 executes the mail processing in which an email is received or a new email message is created and sent by accessing a server terminal through the Internet or the like, and then the system control is returned again to step SA1. This mail processing will be explained in detail later. Finally, when the result of determination in step SA7 is negative, the CPU 10 returns the system control again to step SA1.

It will be explained here by taking the above mentioned processing for redial, directory, registration, and mail, and further character entry processing and telephone call as specific examples that most of the operations can be realized only by the main soft key 3, the first auxiliary soft key 4A, and the second auxiliary soft key 4B in various modes by changing the functions allocated to the main soft key 3, the first auxiliary soft key 4A, and the second auxiliary soft key 4B according to each mode when actually using the mobile telephone 1.

FIG. 4(A) shows an initial mode A0 (FIG. 4(A)) of the soft-key function display area 2A appearing as the initial mode on the LCD display screen 2 immediately after the power for the mobile telephone 1 is switched ON. In this initial mode A0, the icons $I_{A00}$, $I_{A01}$, $I_{A02}$ showing "Register", "Mail", "Menu" are vertically arranged and respectively displayed in the soft-key function display area 2A as functions corresponding to the main soft key 3. Further, the icons $I_{A03}$, $I_{A04}$ showing "Directory" and "Redial" as functions corresponding to the first auxiliary soft key 4A and the second auxiliary soft key 4B respectively are arranged and displayed on the two sides of the icon $I_{A00}$ showing "Register" in the soft-key function display area 2A. In this initial mode A0, when the user presses the second auxiliary soft key 4B corresponding to "Redial", the mode is shifted to a next mode i.e. a redial processing mode A1 (FIG. 4(B)).

In this redial processing (FIG. 3: step SA2) mode A1, a list of telephone numbers from where telephone calls have been received recently and a cursor $C_{A1}$ showing a selected location appear on the LCD display screen 2. An icon $I_{A10}$ showing "Call" as a function corresponding to the main soft key 3 and an icon $I_{A11}$ showing "Clear" as a function corresponding to the second auxiliary soft key 4B are also displayed on the LCD display screen 2. The user can select a desired telephone number by rotating up or down the main soft key 3 to move the cursor $C_{A1}$ up to the location of this desired telephone number. After selecting the telephone, when the main soft key 3 is pressed the mode shifts to calling mode A2 (FIG. 4(C)). When the user presses the second auxiliary soft key 4B to select the icon $I_{A11}$, the CPU 10 executes the function of "Clear" and returns the system control to the above mentioned initial mode A0.

In the calling mode A2, the selected telephone number is dialed, the calling mode is effected, and conversation is started. At this stage, an icon $I_{A20}$ showing "Menu" appears in the soft-key function display area 2A as a function corresponding to the main soft key 3, and icons $I_{A21}$, $I_{A22}$ showing "Record" and "Call release" also appear therein as functions corresponding to the first auxiliary soft key 4A and the second auxiliary soft key 4B. It is also displayed on the LCD display screen 2 that "volume" can be adjusted by rotating the main soft key 3 up and down.

Figure 4D:
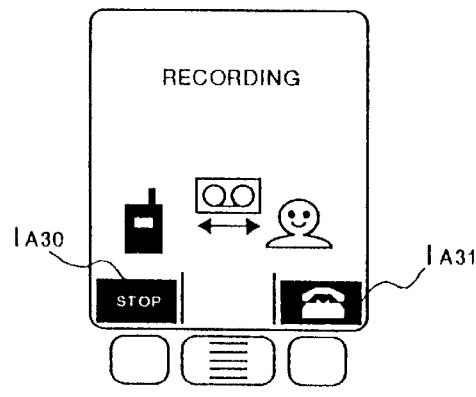
Figure 4B:
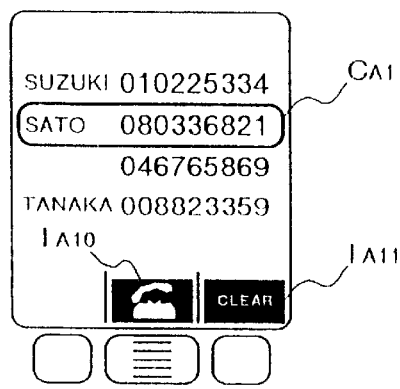

In the calling mode A2, when the user presses the first auxiliary soft key 4A corresponding to "Record", the mode is shifted to the next recording mode A3 (FIG. 4(D)). When the user presses the main soft key 3 corresponding to "Menu" in the calling mode A2, the mode is shifted to menu selecting mode A4 (FIG. 4(E)). Further, when the user presses the second auxiliary soft key 4B corresponding to "Call release" in the calling mode A2, the call is released, and the mode is shifted back to the above mentioned initial mode A0.

When the mode shifts from the calling mode A2 to the recording mode A3 (FIG. 4(D)), the current conversation is recorded. In this recording mode A3, icons $I_{A30}$, $I_{A31}$ showing "Stop" and "Call release" as functions corresponding to the first auxiliary soft key 4A and the second auxiliary soft key 4B respectively are displayed in the soft-key function display area 2A. Herein, when the user presses the first auxiliary soft key 4A corresponding to "Stop" for stopping the recording mode, the mode is returned to the above mentioned calling mode A2. When the user presses the second auxiliary soft key 4B corresponding to "Call release", the call is released, and the mode is shifted back to the above mentioned initial mode A0.

Figure 4E:
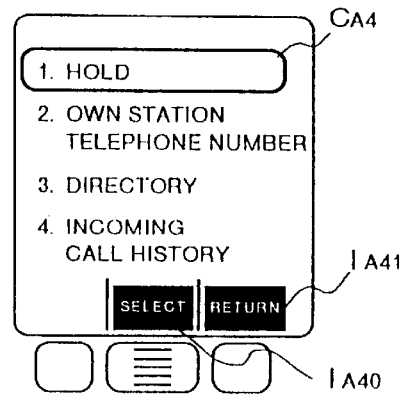
Figure 4C:
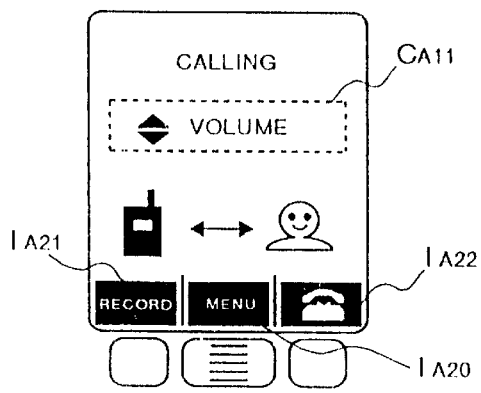

When the mode shifts from the calling mode A2 to the menu selecting mode A4 (FIG. 4(E)), a list of functions executable during a telephone call and the cursor $C_{A4}$ showing a selected location appear on the LCD display screen 2. An icon $I_{A40}$ showing "Select" as a function corresponding to the main soft key 3 and an icon $I_{A41}$ showing "Return" as a function corresponding to the second auxiliary soft key 4B are also displayed on the LCD display screen 2 at the same time. Herein, when the user rotates the main soft key 3 up or down to move the cursor $C_{A4}$ up to a location of a desired menu and presses the main soft key 3 corresponding to "Select", the mode is shifted to the mode corresponding to the function selected by the cursor $C_{A4}$. When the user presses the second auxiliary soft key 4B corresponding to "Return", the mode is shifted to the above mentioned calling mode A2.

Thus, with the mobile telephone 1 as described above, when the redialing is performed, most of the main operations can be realized by rotating and pressing the main soft key 3, and the following operations can be realized by pressing the first auxiliary soft key 4A and the second auxiliary soft key 4B, which allows the usability for a user to greatly be improved.

Figure 5A:
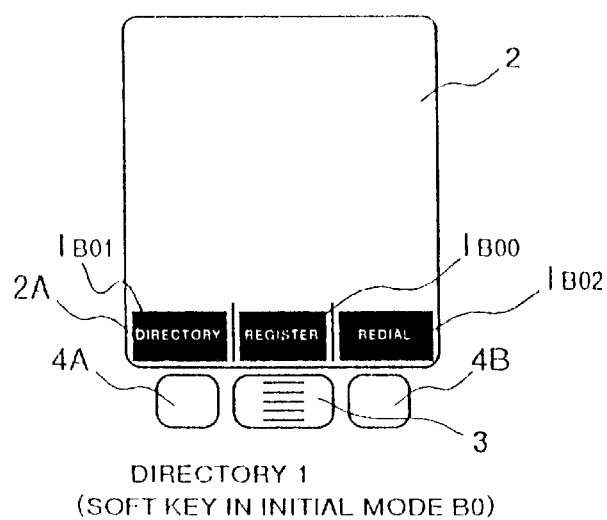
FIG. 5 explains a correlation between a display screen and soft keys in a directory processing in the mobile telephone 1 shown in FIG. 1.

FIG. 5(A) is a view showing contents of the LCD display screen 2 several minutes after the power for the mobile telephone 1 is switched ON and the initial mode A0 (FIG. 4(A)) appears. In this initial mode B0 (FIG. 5(A)), only one line is displayed in the soft-key function display area 2A. In this initial mode B0, an icon $I_{B00}$ showing "Register" as a function corresponding to the main soft key 3 is displayed, and icons $I_{B01}$, $I_{B02}$ showing "Directory" and "Redial" as functions corresponding to the first auxiliary soft key 4A and the second auxiliary soft key 4B respectively are displayed in the soft-key function display area 2A.

Figure 5C:
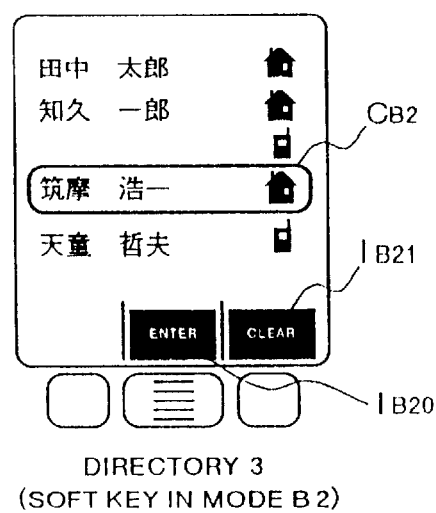
Figure 5B:
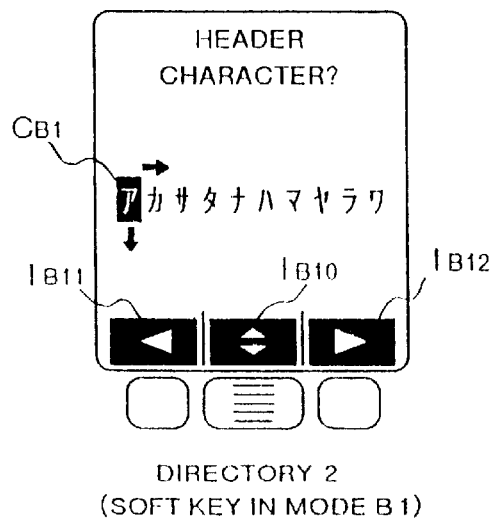

Herein, when the user presses the first auxiliary soft key 4A corresponding to "Directory" indicating a function of calling up a telephone number of a name previously registered, the mode is shifted to the mode B1 corresponding to the directory processing (FIG. 5(B)). In this directory processing (FIG. 3: step SA4) mode B1, the user can search a telephone number with a header alphabet of the registered name. Namely, Japanese katakana alphabets "ア:a,カ:ka, サ:sa,タ:ta,ナ:na,ハ:ha,マ:ma, ヤ:ya,ラ:ra,ワ:wa" and the cursor $C_{B1}$ showing a selected location are displayed on the LCD display screen 2.

Concurrently displayed in the soft-key function display area 2A is an icon $I_{B10}$ showing "Up/Down Arrows" indicating selection of an up and down direction made by rotating the main soft key 3 as a function corresponding thereto, and icons $I_{B11}$, $I_{B12}$ showing "Left Arrow" and "Right Arrow" respectively indicating selection of a right or left direction are displayed therein as functions corresponding to the first auxiliary soft key 4A and second auxiliary soft key 4B. By rotating the main soft key 3 up or down and pressing the first auxiliary soft key 4A and second auxiliary soft key 4B, the movement of the cursor $C_{B1}$ can be controlled. Namely, when a surname Tanaka (田中:Japanese kanji) is to be searched, the cursor $C_{B1}$ is first moved above the katakana alphabet "タ:ta" by operating the second auxiliary soft key 4B and then the main soft key 3 is rotated downward, so that the mode is shifted to the next mode i.e. the directory mode B2 (FIG. 5(C)).

Figure 5D:
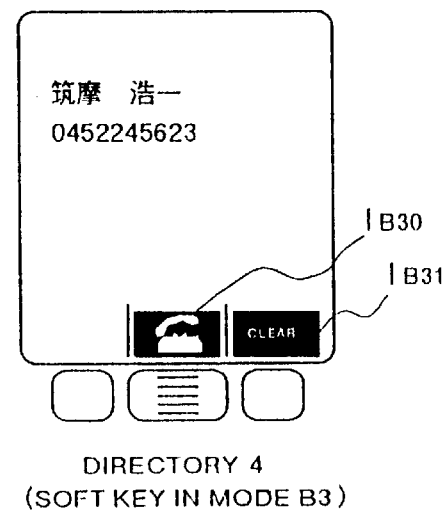

In this directory mode B2, a list of the already registered names (e.g. Japanese Kanji name) and types of telephone machines (e.g. an ordinary telephone or a mobile telephone) and the cursor $C_{B2}$ showing a selected location are displayed on the LCD display screen 2. An icon $I_{B20}$ showing "Enter" as a function corresponding to the main soft key 3 and an icon $I_{B21}$ showing "Clear" as a function corresponding to the second auxiliary soft key 4B are also displayed in the soft-key function display area 2A of the LCD display screen 2. Herein, when the user rotates up and down the main soft key 3 to move the cursor $C_{B2}$ up to a location of a name to which the user desires to make a telephone call and presses the main soft key 3 corresponding to "Enter" after the selection of the name, the mode is shifted to the next mode B3 (FIG. 5(D)) of the processing for telephone. When the user presses the second auxiliary soft key 4B corresponding to "Clear" the mode is changed to the above mentioned initial mode B0.

When shifted to the directory processing mode B3, the selected name and the corresponding telephone number appear on the LCD display screen 2. An icon $I_{B30}$ showing "Call" as a function corresponding to the main soft key 3 and an icon $I_{B31}$ showing "Clear" as a function corresponding to the second auxiliary soft key 4B is concurrently displayed in the soft-key function display area 2A. Herein, when the user presses the main soft key 3 corresponding to "Call", the mode is shifted to the calling mode A2 as described with respect to FIG. 4(C). When the user presses the second auxiliary soft key 4B corresponding to "Clear" the mode is changed to the above mentioned initial mode B0.

With the mobile telephone 1 as described above, even when a desired party is selected from the directory and a telephone call is made according to the directory processing, most of the main operations can be realized by the rotating and pressing the main soft key 3, and the following operations can be realized by pressing the first auxiliary soft key 4A and the second auxiliary soft key 4B, which allows the usability for a user to significantly be improved.

Figure 6A:
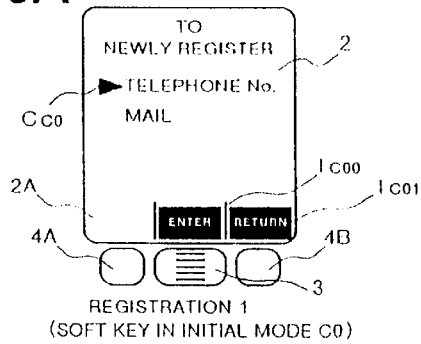
FIG. 6 explains a correlation between a display screen and soft keys in a register processing in the mobile telephone 1 shown in FIG. 1.
Figure 6B:
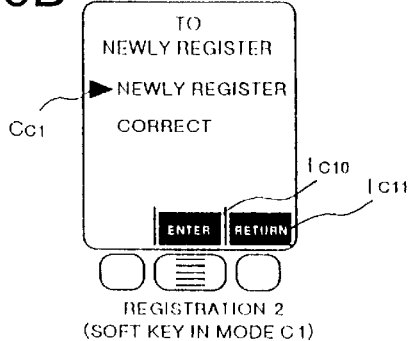

FIG. 6(A) shows registration mode C0 shifted thereto after the main soft key 3 corresponding to "Register" indicating a function of registering a telephone number or an email is pressed in the initial mode A0 in FIG. 4. In this registration processing (FIG. 3: step SA6) mode C0, a screen with two options of "Directory" and "Mail" as a type for new registration and a cursor $C_{C0}$ showing a selected location are displayed on the LCD display screen 2. An icon $I_{C00}$ showing "Enter" as a function corresponding to the main soft key 3 and an icon $I_{C01}$ showing "Return" as a function corresponding to the second auxiliary soft key 4B are concurrently displayed in the soft-key function display area 2A of the LCD display screen 2. Herein, when the user rotates the main soft key 3 up or down to move the cursor $C_{B2}$ up to a desired item and then presses the main soft key 3 corresponding to "Enter", the mode is shifted to the next mode i.e. the registration mode C1 (FIG. 6(B)). When the user presses the second auxiliary soft key 4B corresponding to "Return" the mode is shifted to the above mentioned initial mode A0 (FIG. 4(A)).

In the registration mode C1, a screen showing two options of "Newly Register" and "Correct" and a cursor $C_{C0}$ showing a selected location are displayed on the LCD display screen 2. An icon $I_{C10}$ showing "Enter" as a function corresponding to the main soft key 3 and an icon $I_{C11}$ showing "Return" as a function corresponding to the second auxiliary soft key 4B are also displayed in the soft-key function display area 2A of the LCD display screen 2. Herein, when the user rotates the main soft key 3 up or down to move the cursor $C_{c1}$ above a desired item and then presses the main soft key 3 corresponding to "Enter", the mode is shifted to the next mode i.e. registration mode C2 (FIG. 6(C)). When the user presses the second auxiliary soft key 4B corresponding to "Return" the mode is shifted to the above mentioned registration mode C0.

Figure 6C:
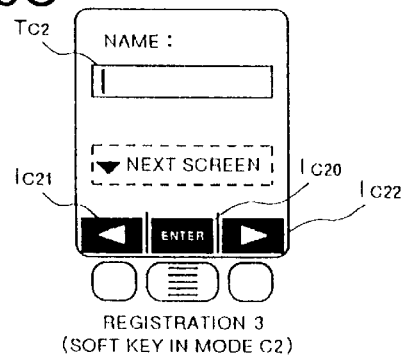
Figure 6D:
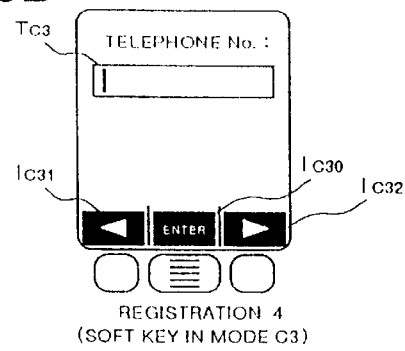
Figure 6E:
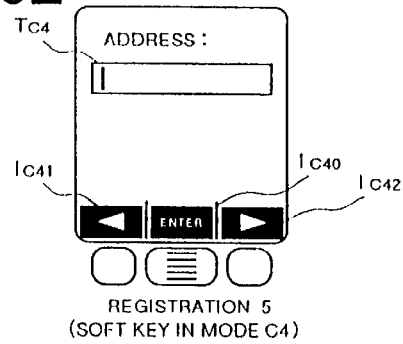

In the registration mode C2, a tab $T_{C2}$ where a name may be entered, and "Next Screen" which indicates that next screen can be displayed by rotating the main soft key 3 in the downward direction is displayed on the LCD display screen 2. Concurrently displayed in the soft-key function display area 2A is an icon $I_{C20}$ showing "Enter" as a function corresponding to the main soft key 3, and icons $I_{C21}$, $I_{C22}$ showing "Left Arrow" and "Right Arrow" respectively as functions corresponding to the first auxiliary soft key 4A and second auxiliary soft key 4B respectively. When the user enters characters according to a method described later in FIG. 7 in the tab $T_{C2}$ and rotates the main soft key 3 downward, the mode is shifted to the next mode i.e. the registration mode C3 (FIG. 6(D)).

In this registration mode C3, in the same manner as the registration mode C2, a tab $T_{C3}$ where a telephone number may be entered, and icons $I_{C30}$, $I_{C31}$, $I_{C32}$ showing "Enter", "Left Arrow", and "Right Arrow" are also displayed as functions corresponding to the main soft key 3, the first auxiliary soft key 4A, and the second auxiliary soft key 4B respectively. After entering the telephone number in the tab $T_{C3}$ and then pressing the main soft key 3, the mode is shifted back the above mentioned registration mode C0.

When "Mail" is selected in the registration mode C0, the registration modes C1, C2 are processed first, and then the screen is shifted to the next mode i.e. registration mode C4 (FIG. 6 (E)) where a screen for inputting an email address is displayed. In this registration mode C4, in the same manner as the above mentioned registration mode C2, a tab $T_{C4}$ where an email address can be entered and icons $I_{C40}$, $I_{C41}$, $I_{C42}$ showing "Enter", "Left Arrow", and "Right Arrow" are displayed as functions corresponding to the main soft key 3, the first auxiliary soft key 4A, and the second auxiliary soft key 4B respectively. After entering the email address in the tab $T_{C4}$ and then pressing the main soft key 3, the mode is shifted back the above mentioned registration mode C0.

Figure 6F:
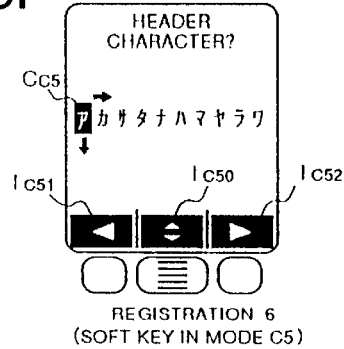

When "Correct" is selected in the registration mode C1, a registration mode C5 (FIG. 6(F)) having a screen with the same appearance as the directory processing mode B1 explained with respect to FIG. 5(B) appears on the LCD display screen 2. In this mode, when a Japanese katakana character at the header of the name of the registered person is selected by operating the main soft key 3, the first auxiliary soft key 4A, and the second auxiliary soft key 4B, the next mode i.e. the registration mode C6 (FIG. 6(G)) having a screen with the same appearance as the directory processing mode B2 explained with respect to FIG. 5(B) appears on the LCD display screen 2. Further, when the user rotates the main soft key 3 to move a cursor $C_{C6}$ above the name of the person whose data is to be corrected in this registration mode C6 and then presses the main soft key 3 corresponding to "Enter" (icon $I_{C60}$), the mode shifts to the next mode i.e. the registration mode C7 (FIG. 6(H)). When the user presses the second auxiliary soft key 4B corresponding to "Clear" (icon $I_{C61}$) the mode is shifted to the above mentioned initial mode C0.

In the registration mode C7, name of the person whose data is to be corrected, his/her telephone number(s) and email address(es), and a cursor $C_{C7}$ showing a selected location appear on the screen. The cursor $C_{C7}$ may be moved to the item to be corrected by rotating the main soft key 3 up or down. For example, when the telephone number is to be corrected, by pressing the main soft key 3 corresponding to "Correct" at the location of the telephone number to be corrected, the mode is shifted to the above mentioned registration mode C3, and returns to the original Register mode C7 after the correction of the telephone number. When the user presses the second auxiliary soft key 4B corresponding to "Clear" the mode is shifted back to the above mentioned initial mode C0.

With the mobile telephone 1 as described above, when the registration processing of registering a new data or a correction of an already existing data in the directory is performed, most of the main operations can be realized by rotating and pressing the main soft key 3, and the following operations can be realized by pressing the first auxiliary soft key 4A or the second auxiliary soft key 4B, which allows the usability for a user to significantly be improved.

Figure 7A:
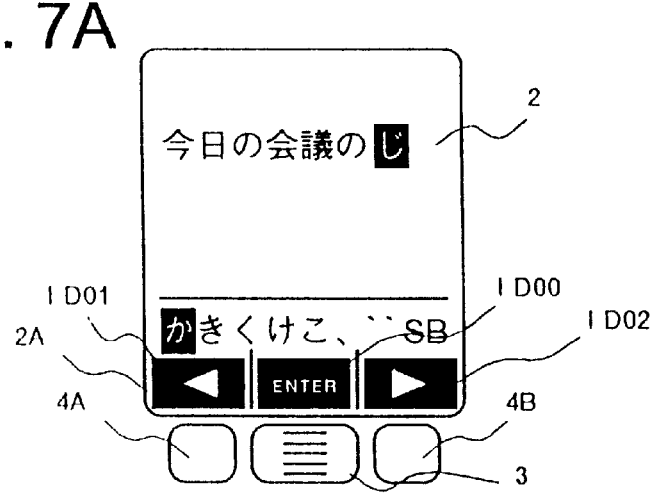
FIG. 7 explains a correlation between a display screen and soft keys in a character entry processing in the mobile telephone 1 shown in FIG. 1.
Figure 7B:
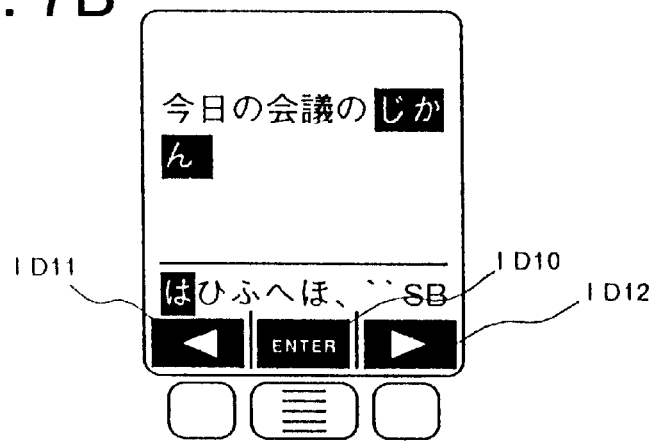
Figure 7C:
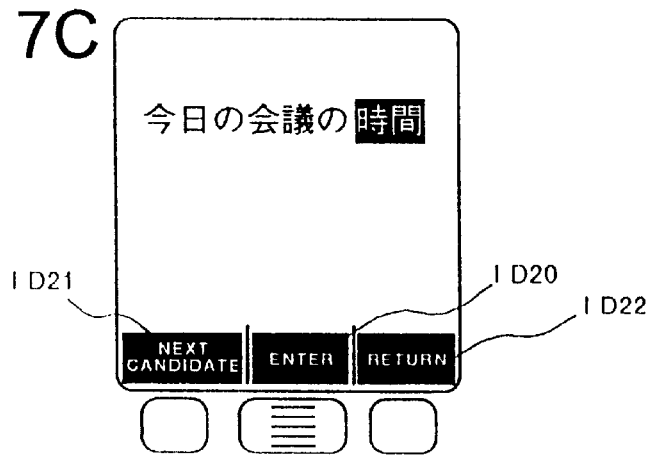

When characters are to be entered like in the registration mode C2 explained with respect to FIG. 6(C), a character entry initial mode D0 (FIG. 7(A)) having a screen where characters can be entered is displayed on the LCD display screen 2. For example, when "時間" (jikan, meaning time) is to be input, then the Japanese hiragana characters are displayed in the soft-key function display area 2A of the LCD display screen 2. Then, by operating either the first auxiliary soft key 4A or the second auxiliary soft key 4B a character in any of the left or right direction is selected, and by rotating the main soft key 3 in up or down direction a character in any of the up or right direction can be selected. By pressing the main soft key 3 corresponding to "Enter" after bringing the cursor on the character to be entered, this particular character is displayed in the sentence displayed above.

A space may be inserted between the characters by moving the cursor over S and pressing the main soft key 3 corresponding to "Enter". The cursor may be moved backward by moving the cursor over B and pressing the main soft key 3 corresponding to "Enter". When all the characters required for kana to kanji conversion are entered as shown in the character entry mode D1 (FIG. 7(B)) then kana-kanji conversion can be performed by pressing the convert key in the above mentioned ten-key and power/confirm key group 5 and the mode shifts to next mode i.e. the character entry mode D2 (FIG. 7(C)).

In the character entry mode D2, a first candidate after the kana is concerted to kanji is displayed. If the kanji(s) is not the appropriate one, then a different kanji(s) is displayed each time the first auxiliary soft key 4A corresponding to "Next Candidate" is pressed. When the appropriate kanji(s) is displayed then this kanji(s) can be confirmed by pressing the main soft key 3 corresponding to "Enter". Further, when the second auxiliary soft key 4B corresponding to "Return" is pressed then the character entry screen is closed.

With the mobile telephone 1 as described above, when characters are to be entered, most of the main operations can be realized by rotating and pressing the main soft key 3, and the following operations can be realized by pressing the first auxiliary soft key 4A or the second auxiliary soft key 4B. This allows characters to be entered with extremely simple operations and the usability for a user to more significantly be improved as compared to the method of the conventional technology in which a plurality of alphabets are allocated to each key of the ten-key respectively in the ten-key and power/confirm key group 5 and selection is made by pressing these keys a multiple time.

Figure 8A:
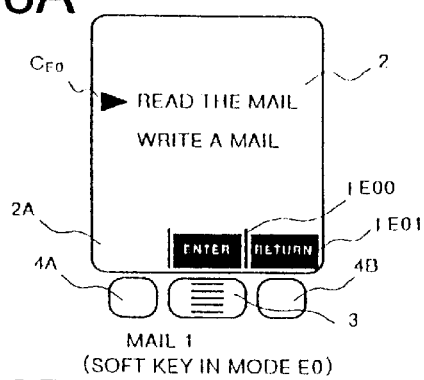
FIG. 8 explains a correlation between a display screen and soft keys in a mail processing in the mobile telephone 1 shown in FIG. 1.
Figure 8B:
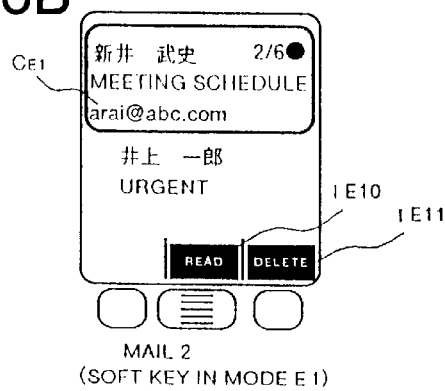

In the initial mode A0 described above in FIG. 4, by rotating the main soft key 3, the icon $I_{A01}$ for "Mail" indicating an email is displayed in the lowest location of the three icons $I_{A00}$, $I_{A01}$, $I_{A02}$ corresponding to the main soft key 3, and then by pressing the main soft key 3, the mode is shifted to mode E0 (FIG. 8(A)) of Mail processing (FIG. 3: step SA). In this mail processing mode E0, a screen having two options of "Read the Mail" and "Write a Mail" and a cursor $C_{E0}$ showing a selected location appear on the display. An icon $I_{E00}$ showing "Enter" as a function corresponding to the main soft key 3, and an icon $I_{E01}$ showing "Return" as a function corresponding to the second auxiliary soft key 4B are also displayed in the soft-key function display area 2A of the LCD display screen 2. Herein, when the user rotates the main soft key 3 up or down to move the cursor $C_{B2}$ before a desired item and presses the main soft key 3 corresponding to "Enter" at the location of, for example, "Read Mail", the mode is shifted to the next mode i.e. the mail processing mode E1 (FIG. 8(B)). When the user presses the second auxiliary soft key 4B corresponding to "Return" the mode is shifted back to the above mentioned initial mode A0 (FIG. 4(A)).

Figure 8C:
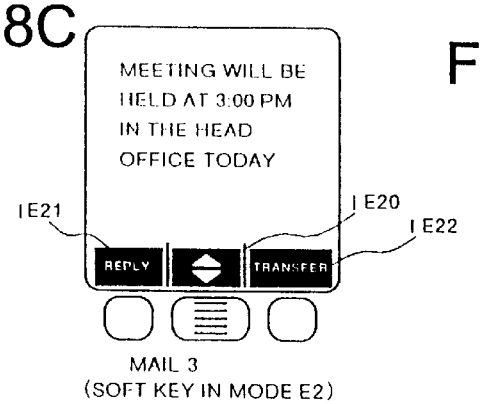

In the mail processing mode E1, a portion of the emails in the list of received mails and a cursor $C_{E1}$ showing a selected location are displayed on the LCD display screen 2. An icon $I_{E10}$ showing "Read" as a function corresponding to the main soft key 3, and an icon $I_{E11}$ showing "Delete" as a function corresponding to the second auxiliary soft key 4B are displayed in the soft-key function display area 2A of the LCD display screen 2. Herein, when the user rotates the main soft key 3 up or down to move the cursor $C_{E1}$ above a desired item and presses the main soft key 3 corresponding to "Read", the mode is shifted to the next mode i.e. the mail processing mode E2 (FIG. 8(C)). By pressing the second auxiliary soft key 4B corresponding to "Delete" a corresponding unrequited mail may be deleted.

Figure 8D:
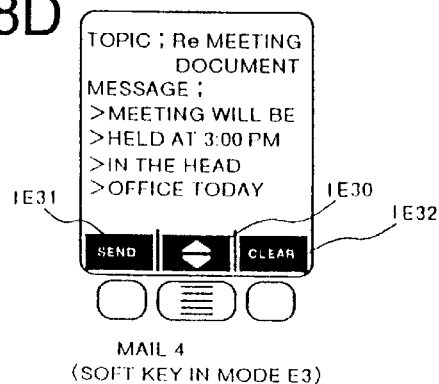
Figure 8E:
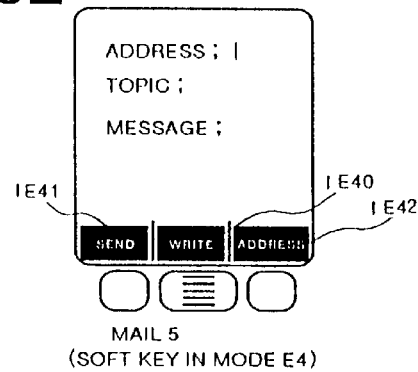
Figure 8F:
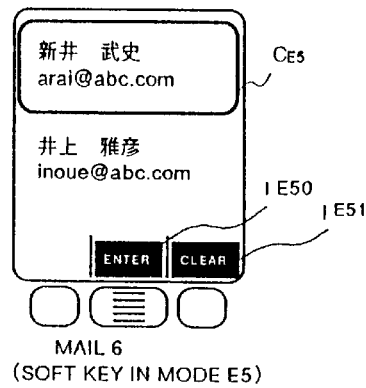
Figure 8G:
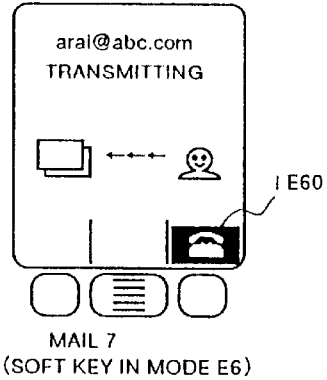

In the mail processing mode E2, message in the selected mail is displayed on the LCD display screen 2. An icon $I_{E20}$ showing "Up/Down" directions as a function corresponding to the main soft key 3, and icons $I_{E21}$, $I_{E22}$ showing "Reply" and "Transfer" as functions corresponding to the first auxiliary soft key 4A and the second auxiliary soft key 4B respectively are displayed in the soft-key function display area 2A of the LCD display screen 2. Herein, when the user presses the first auxiliary soft key 4A corresponding to "Reply", the mode is shifted to the next mode i.e. the mail processing mode E3 (FIG. 8(D)). By pressing the second auxiliary soft key 4B corresponding to "Transfer", the mode is shifted to the create mail mode E4 (FIG. 8 (E)).

When shifted to the create mail mode E4 for transferring an email, a screen having the read message displayed thereon other than the email address appears on the LCD display screen 2. When the main soft key 3 corresponding to "Enter" is pressed at the location of "Write a Mail" in the initial mode E0 and the mode is shifted to the create mail mode E4, fields for items of "Address", "Title", and "Message" appear on the LCD display screen 2 as display for creating a message. An icon $I_{E40}$ showing "Write" as a function corresponding to the main soft key 3, and icons $I_{E41}$, $I_{E42}$ showing "Send" and "Address" as functions corresponding to the first auxiliary soft key 4A and the second auxiliary soft key 4B are displayed in the soft-key function display area 2A of the LCD display screen 2. Herein, when the user presses the second auxiliary soft key 4B corresponding to "Address", the mode is shifted to the next mode i.e. the create mail mode E5 (FIG. 8(F)) via the processing of selecting an email address from the directory according to the directory processing mode B1 explained with respect to FIG. 5.

In this create mail mode E5, "Name" and "Address" corresponding to data before and after a selected name in directory are displayed on the LCD display screen 2, and a cursor $C_{E5}$ showing a selected location is also displayed. An icon $I_{E50}$ showing "Enter" as a function corresponding to the main soft key 3, and an icon $I_{E51}$ showing "Clear" as a function corresponding to the second auxiliary soft key 4B are also displayed in the soft-key function display area 2A of the LCD display screen 2. Herein, when the user rotates the main soft key 3 to move the cursor $C_{E5}$ above the address of a party to whom an email is to be sent and then presses the main soft key 3 corresponding to "Enter", the mode is returned to the above mentioned create mail mode E4, and the email address of the selected party to whom an email is to be sent appears on the screen.

Figure 6G:
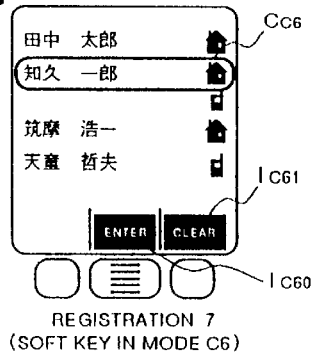
Figure 6H:
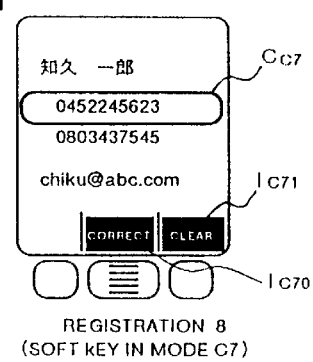

In the create mail mode E4, when the character entry processing in FIG. 7 is executed, entry of a message is complete, and the first auxiliary soft key 4A showing "Send" is pressed, the mode is shifted to the next mode i.e. the send mail E6 (FIG. 6(G)). By operating the first auxiliary soft key 4A showing "Clear", the mode is returned to the mail processing mode E2 where emails can be read. In the send mail mode E6, a notice that the mail is being sent to the desired email address appears on the display screen 2. An icon $I_{E60}$ showing "Call Release" as a function corresponding to the second auxiliary soft key 4B is displayed in the soft-key function display area 2A. When no key is operated when the email is being sent, then the mail is sent and the mode is automatically returned to the above mentioned initial mode E0. By pressing the second auxiliary soft key 4B showing "Call Releases" during sending of the email, sending of the email is terminated and again the mode is returned to the initial mode E0.

It should be noted that, when the mode is shifted from the mail processing mode E2 where an email is read to the mail processing mode E3 where email is sent, the title and message with a reference symbol ">" added thereto are displayed on the LCD display screen 2 as information for the mail as an object for reply. An icon $I_{E20}$ showing "Up/Down" directions as a function corresponding to the main soft key 3, and icons $I_{E31}$, $I_{E32}$ showing "Send" and "Clear" as functions corresponding to the first auxiliary soft key 4A and the second auxiliary soft key 4B are displayed in the soft-key function display area 2A. Herein, when the user rotates the main soft key 3 up or down to decide a location where a document is inputted and presses the main soft key 3, the mode is shifted to one in FIG. 7 where characters are entered, and returned again to this mail processing mode E3 after entry of characters. When characters are entered and the first auxiliary soft key 4A showing "Send" is pressed, the mode is shifted to the send mail mode E6 described above. By operating the second auxiliary soft key 4B showing "Clear", the mode is returned to the mail processing mode E2 where the emails can be read.

With the mobile telephone 1 as described above, when entering the characters for reading, creating, replying, and transferring a email messages or the like, most of the main operations can be realized by rotating and pressing the main soft key 3, and the following operations can be realized by pressing the first auxiliary soft key 4A and the second auxiliary soft key 4B, which allows mail processing to be executed with extremely simple operations and the usability for a user to significantly be improved.

Figure 9A:
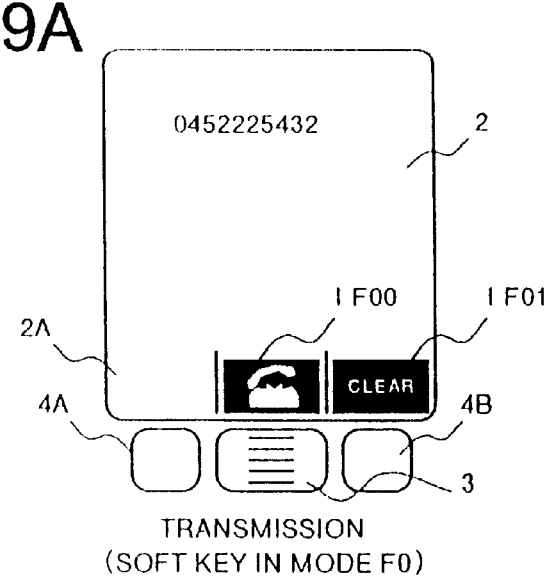
FIG. 9 is explains a correlation between a display screen and soft keys in a call/receive mail processing in the mobile telephone 1 shown in FIG. 1.

For example, when a telephone number is entered with the ten-key in the ten-key and power/confirm key group 5 in the initial mode A0 (FIG. 4(A)), the mode is shifted to the next mode i.e. the transmission mode F0 (FIG. 9(A)). This entered telephone number is displayed on the LCD display screen 2 in this transmission mode F0. It should be noted that, when the entered telephone number has previously been registered in the directory, the corresponding name may be displayed thereon. An icon $I_{F00}$ showing "Call" as a function corresponding to the main soft key 3, and an icon $I_{F01}$, showing "Clear" as a function corresponding to the second auxiliary soft key 4B are displayed in the soft-key function display area 2A. At this stage, the display of "Call" corresponding to the main soft key 3 is blinked, which tells the user that the key is preferential. When the user presses the main soft key 3, the mode is shifted to the calling mode B3 described above with respect to FIG. 5. When the user presses the second auxiliary soft key 4B corresponding to "Clear" the mode is shifted back to the above mentioned initial mode A0.

Figure 9B:
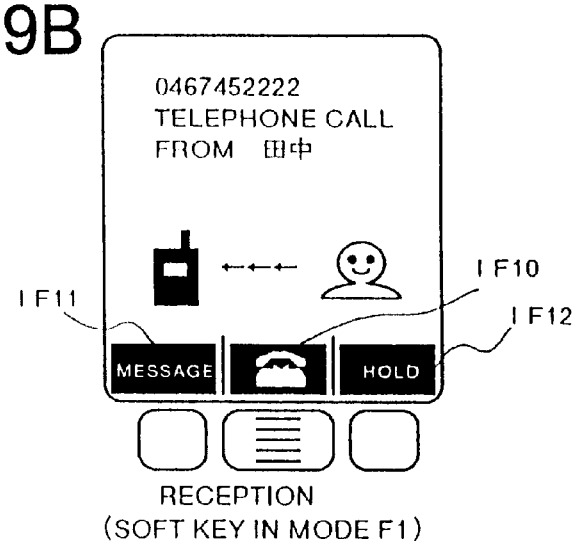

When a telephone call is received from outside, all the operations are suspended, and the mode is shifted to the next mode i.e. the reception mode F1 (FIG. 9(B)). In this reception mode F1, the telephone number of the received telephone call is displayed, and when this number has already been registered in the telephone book the corresponding name of the calling party is displayed on the LCD display screen 2. An icon $I_{F10}$ showing "Call" as a function corresponding to the main soft key 3, and icons $I_{F11}$, $I_{F12}$ showing "Message" and "Hold" as functions corresponding to the first auxiliary soft key 4A and the second auxiliary soft key 4B are displayed in the soft-key function display area 2A. At this stage, the display of "Call" corresponding to the main soft key 3 is blinked, which tells the user that the key is preferential. When the user presses the main soft key 3, the mode is shifted to the calling mode B3 described above with respect to FIG. 5. By pressing the first auxiliary soft key 4A corresponding to "Message", the mode is shifted to a mode where the message may be recorded, and then the mode is returned to the initial mode A0. By pressing the second auxiliary soft key 4B corresponding to "Hold", the message telling the calling party to hold is transmitted to the calling party. By pressing the main soft key 3, the mode is shifted to the calling mode B3 described above with respect to FIG. 5.

Figure 9C:
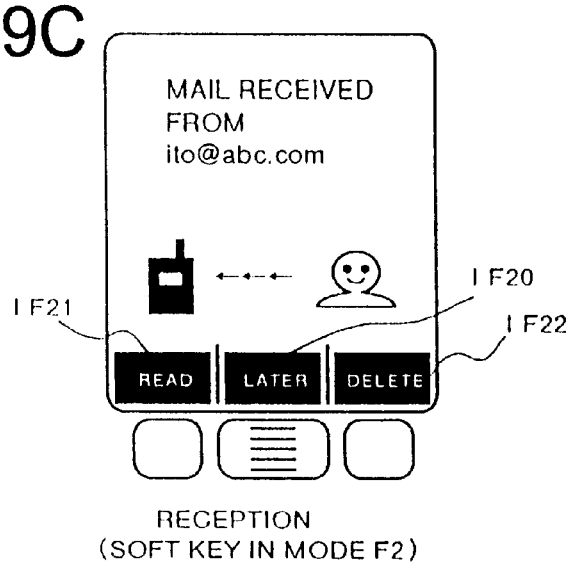

When a mail is received, all the operations are suspended, and the mode is shifted to the next mode i.e. the mail reception processing mode F2 (FIG. 9(C)). In this mail reception mode F2, information showing the sender's email address and a message telling that an email has arrived is displayed on the LCD display screen 2. An icon $I_{F20}$ showing "Later" as a function corresponding to the main soft key 3, and icons $I_{F21}$, $I_{F22}$ showing "Read" and "Delete" as functions corresponding to the first auxiliary soft key 4A and the second auxiliary soft key 4B are displayed in the soft-key function display area 2A. When the user presses the main soft key 3 corresponding to "Later", the mode is returned to the previously operating mode. By pressing the first auxiliary soft key 4A corresponding to "Read", the mode is shifted to mode where a mail message filled with characters is displayed in the create mail mode E4 in FIG. 8. Further, by pressing the second auxiliary soft key 4B corresponding to "Delete", the arrived mail is deleted.

With the mobile telephone 1 as described above, when the telephone call is made or received, and further an email is received, most of the main operations can be realized by rotating and pressing the main soft key 3, and the following operations can be realized by pressing the first auxiliary soft key 4A or the second auxiliary soft key 4B, which allows the process of making or receiving of telephone calls, or receiving of emails to be realized with extremely simple operations and the usability for a user to significantly be improved. By explicitly displaying functions required for operations and a preferential relation among the functions with blinking of the display, color or a positional relation so that the order of importance there among can easily be specified, so that the user can operate the functions corresponding to each key without any confusion.

Figure 10A:
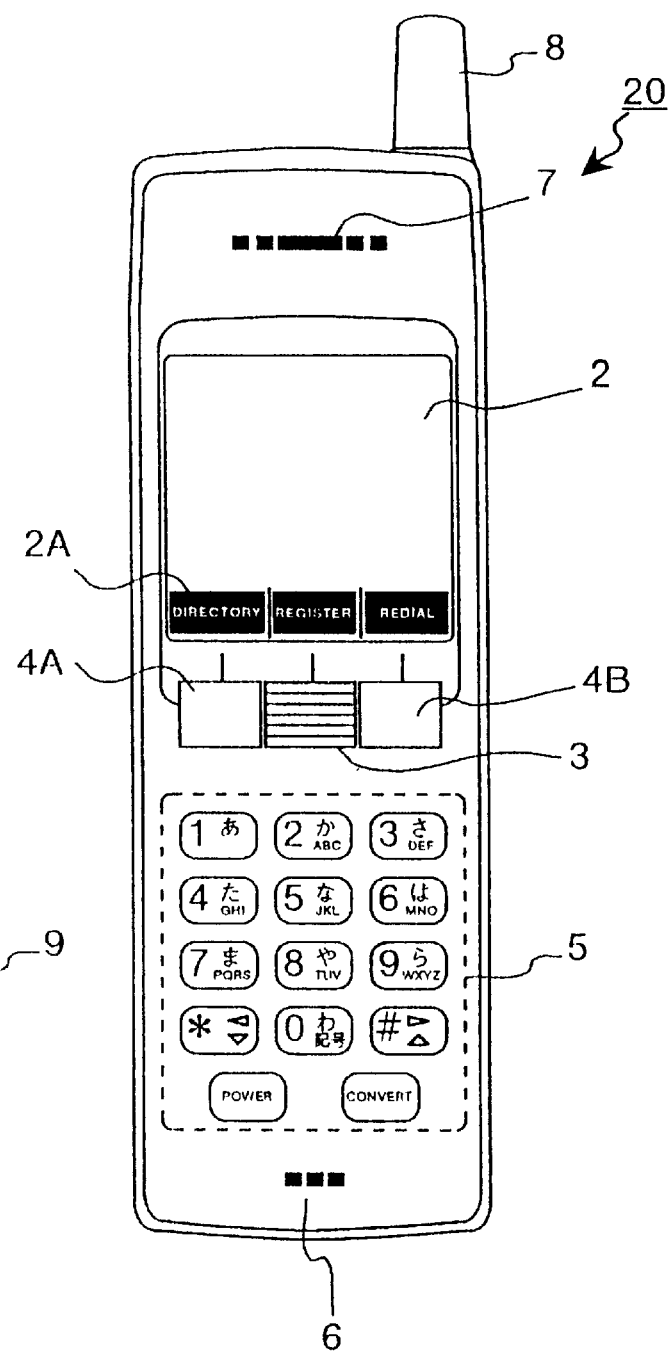
FIG. 10 is a general plan view showing appearance of a mobile telephone 20 which is the portable terminal according to Embodiment 2 of the present invention.
Figure 10B:
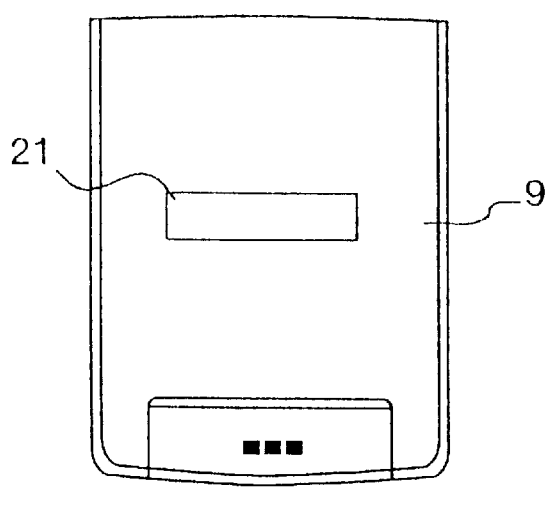

FIG. 10 is a plan view showing external configuration of the mobile telephone 20 as an example of the portable terminal according to Embodiment 2 of the present invention. In this figure, the same reference numerals are assigned to the sections corresponding to those in FIG. 1, and description thereof is omitted herein. As shown in FIG. 2, an information key 21 is newly provided in the mobile telephone 20. This information key 21 is provided at the central section of the top surface of the flip 9, and when this key is pressed a connection to the Internet (Internet connection processing) is realized with one touch.

The Internet connection processing herein is a processing for accessing, through a radio line or the Internet, a host terminal connected to the Internet by using a function of radio communication provided in the mobile telephone 20. The Internet connection processing will be explained in detail later. The basic operations in the mobile telephone 20 are the same as that (the redial, directory, register, mail, and character entry processing or the like) in the mobile telephone 1 described above, and so detailed description thereof is omitted herein.

FIG. 11 is a block diagram showing electrical configuration of the key section of the mobile telephone 20 shown in FIG. 10. In this figure, the same reference numerals are assigned to the sections corresponding to those in FIG. 2, and description thereof is omitted herein. In FIG. 11, the information key 21 (Refer to FIG. 10) is newly provided therein, and the CPU 10 executes the Internet connection processing when a user presses this information key 21. The computer programs required for Internet connection processing are also stored in the ROM 11.

Figure 12:
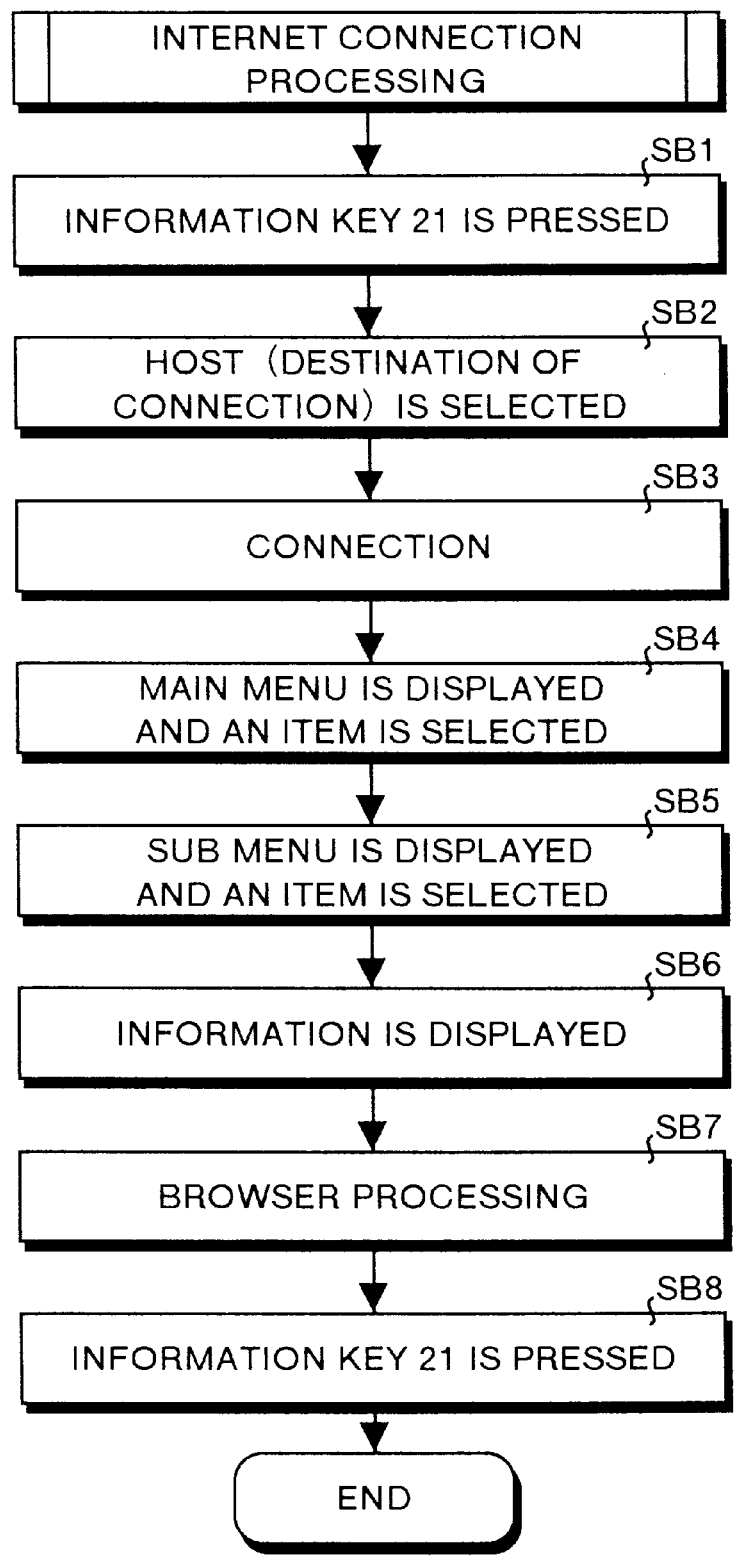
FIG. 12 is a flow chart for explaining an Internet connection processing in the mobile telephone 20 shown in FIG. 10.
Figure 13A:
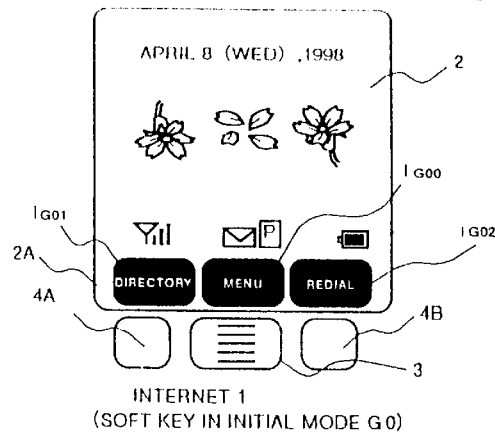
FIG. 13 explains a correlation between a display screen and soft keys in the Internet connection processing in the mobile telephone 20 shown in FIG. 10.

Next, the Internet connection processing is described while referring to FIG. 12. When power of the mobile telephone 20 shown in FIG. 10 is turned ON, a screen of an initial mode G0 appears in the soft-key function display area 2A on the LCD display screen 2 as shown in FIG. 13(A). Namely, in this initial mode A0, an icon IG00 showing "Menu" is displayed as a function corresponding to the main soft key 3 in the soft-key function display area 2A, and also icons $I_{G01}$, $I_{G02}$ showing "Directory" and "Redial" as functions corresponding to the first auxiliary soft key 4A and the second auxiliary soft key 4B respectively are arranged and displayed on the two sides of the icon $I_{G00}$ showing "Menu".

In such a state, when the information key 21 (Refer to FIG. 10) is pressed by the user in step SB1 shown in FIG. 12, the CPU 10 (Refer to FIG. 11) executes processes after step SB2 and on. Namely, when the information key 21 is pressed, the mode is shifted from the initial mode A0 to the next mode i.e. the Internet processing (FIG. 13(B)) mode G1. In this mode G1, a list of host terminals as destinations for access through the Internet is displayed on the LCD display screen 2. As an example, a list of six host terminals of "Host 1" to "Host 6" has been displayed in the figure.

An icon $I_{G10}$ showing "Select" as a function corresponding to the main soft key 3, and an icon $I_{G11}$ showing "Return" as a function corresponding to the second auxiliary soft key 4B are displayed in the soft-key function display area 2A on the LCD display screen 2. The "Select" indicates selection of a host terminal out of "Host 1" to "Host 6" by moving a cursor $C_{G1}$ over the desired host. When the user selects a desired host terminal by rotating the main soft key 3 up or down to move the cursor $C_{G1}$ over desired host terminal (step SB2). Assuming that "Host 1" is to be selected, the user moves the cursor $C_{G1}$ over the location of "Host 1" and presses the main soft key 3.

Figure 13D:
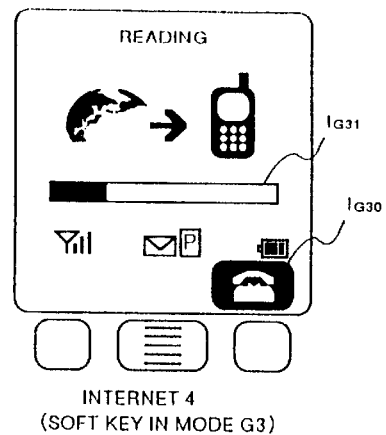
Figure 13B:
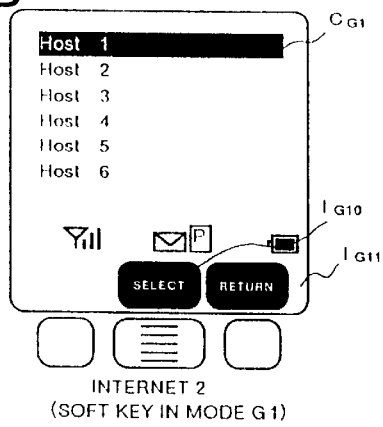
Figure 13E:
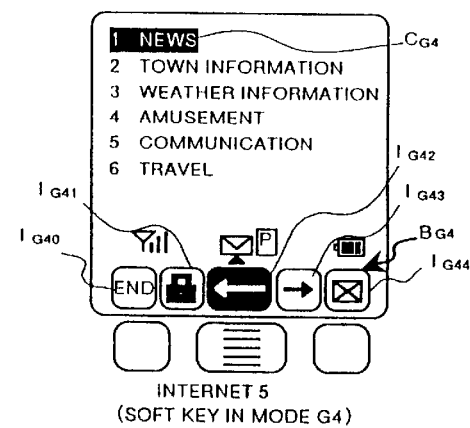
Figure 13C:
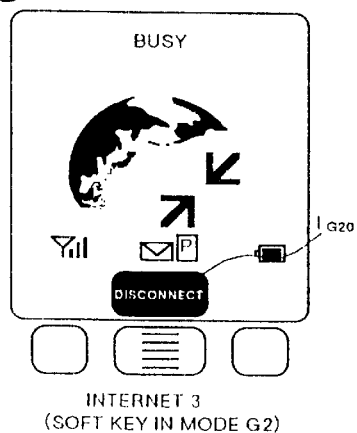

When the host terminal is selected, the mode is shifted from the mode G1 (FIG. 13(B)) to the mode G2 (FIG. 13(C)), and connect with the Internet is established (step SB3). When the user presses the second auxiliary soft key 4B in order to select the icon $I_{G11}$, the mode is returned from the mode G1 to the above mentioned initial mode G0 (FIG. 13(A)). When shifted to the mode G2 of Internet connection processing, access to the selected "Host 1" is made through the Internet. An icon $I_{G20}$ showing "Disconnect" as a function corresponding to the main soft key 3 is displayed in the soft-key function display area 2A. It should be noted that, when the main soft key 3 is pressed in order to select "Disconnect" then the Internet connection processing is terminated.

When the access to "Host 1" is established, the mode is shifted from the mode G2 to mode G3 (FIG. 13(D)), and data is read from "Host 1". In this mode G3, an icon $I_{G31}$ showing an amount of data read is displayed according to a length of a bar on the LCD display screen 2. An icon $I_{G30}$ showing "Call Release" as a function corresponding to the second auxiliary soft key 4B is displayed in the soft-key function display area 2A on the LCD display screen 2. It should be noted that, when the second auxiliary soft key 4B is pressed in order to select "Call Release", the Call-Release processing is executed, and the mode is shifted from the mode G3 to the above mentioned initial mode G0 (FIG. 13(A)).

When reading data from "Host 1" is complete, the mode is shifted from the mode G3 to mode G4 (FIG. 13(E)), and a main menu for searching information obtained from the read data is displayed on the LCD display screen 2 (step SB4). As an example, total six items of "1 News", "2 Town information", "3 Weather information", "4 Amusement", "5 Communication", and "6 Travel" are displayed on the LCD display screen 2 at this stage as the items of the main menu as shown in FIG. 13(E).

Figure 15:
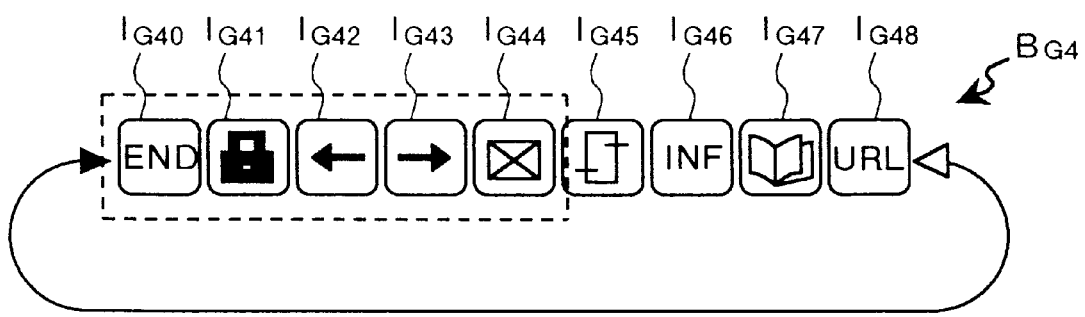
FIG. 15 is a view showing an icon group $B_{G4}$ for a browser function as a whole in processing for connection to the Internet of the mobile telephone 20 shown in FIG. 10.

A browser-function icon group $B_{G4}$ comprising browser-function items displayed with icons are displayed in the soft-key function display area 2A on the LCD display screen 2. As shown in FIG. 15, the browser-function icon group $B_{G4}$ consists of nine items such as an icon $I_{G40}$, an icon $I_{G41}$, ..., and an icon $I_{G48}$, and is configured in a loop so that the icon $I_{G40}$ and icon $I_{G48}$ are linked to each other. Displayed in the soft-key function display area 2A on the LCD display screen 2 shown in FIG. 13(E) are five icons of the icon $I_{G40}$, icon $I_{G41}$, ..., and the icon $I_{G44}$ of the browser-function icon group $B_{G4}$ shown in FIG. 15.

In the mode G4, the user selects a desired item out of the six items in the main menu by rotating the main soft key 3 up or down in order to move the cursor $C_{GG4}$ over the desired host terminal (step SB4). In this case, assuming that the item "1 News" is to be selected, then the user moves the cursor $C_{G4}$ above the item "1 News" and presses the main soft key 3.

Figure 13F:
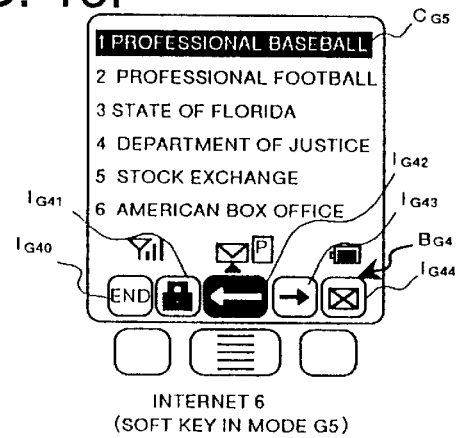

When an item from the main menu is selected, the mode is shifted from the mode G4 (FIG. 13(E)) to the mode G5 (FIG. 13(F)), and a sub menu obtained by further classifying the selected item "1 News" into small items is displayed on the LCD display screen 2 (step SB5). As an example, total six items of "1 Professional Baseball", "2 Professional Football", "3 State of Florida", "4 Department of Justice", "5 Stock Exchange", and "6 American box office" are displayed on the LCD display screen 2 at this stage as a items of the sub menu as shown in FIG. 13(F).

Figure 14A:
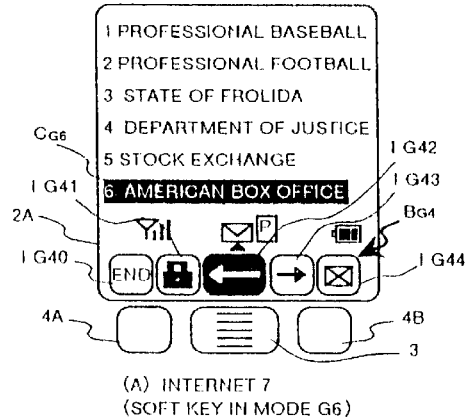
FIG. 14 explains a correlation between a display screen and soft keys in the Internet connection processing in the mobile telephone 20 shown in FIG. 10.

In this mode G5, the user selects a desired item from the sub menu of the six items by rotating the main soft key 3 up or down in order to move a cursor $C_{G5}$ over the location of the desired host terminal (step SB5). In this case, assuming that the item "6 American box office" is to be selected, the user moves the cursor $C_{G6}$ over the item "6 American box office" as shown in FIG. 14(A) and presses the main soft key 3.

Figure 14D:
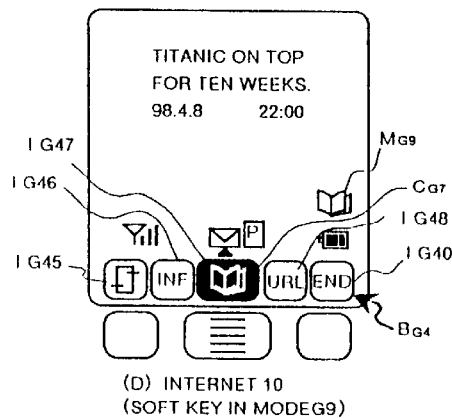
Figure 14B:
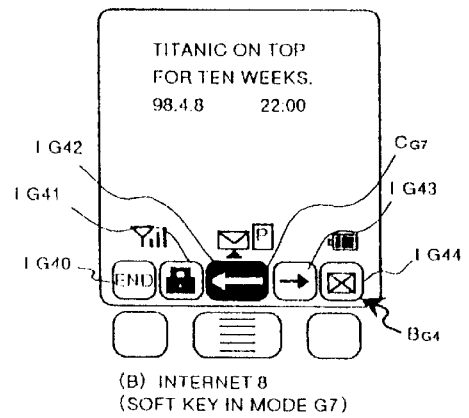

When the user selects an item from the sub menu as described above, the mode is shifted from mode G6 (FIG. 14(A)) to a mode G7 (FIG. 14(B)), and "Titanic on top 22:00" which is the contents corresponding to the item "6 American box office" is displayed on the LCD display screen 2 (step SB6).

Then, in the mode G7, when a desired icon is selected by the user out of the browser-function icon group $B_{G4}$, the browser processing described later (step SB7) is performed. More specifically, assuming that the icon $I_{G47}$ corresponding to bookmark is to be selected from the browser-function icon group $B_{G4}$ shown in FIG. 15, then the browser-function icon group $B_{G4}$ as a whole is shifted in the right direction or the left direction by pressing the first auxiliary soft key 4A or the second auxiliary soft key 4B such that the icon $I_{G47}$ appears at the position of the cursor $C_{G7}$ located at the central portion of the soft-key function display area 2A.

Namely, the browser-function icon group $B_{G4}$ is shifted in the left direction each time the user presses the second auxiliary soft key 4B, with which the icon positioned at the cursor $C_{G7}$ is changed in the order of icon $I_{G42}$ to icon $I_{G43}$ to icon $I_{G44}$ ... On the other hand, when the first auxiliary soft key 4A is pressed, the browser-function icon group $B_{G4}$ is shifted in the right direction. It should be noted that, conversely, the moving direction of the group may be changed so that the browser-function icon group $B_{G4}$ is shifted in the left direction by pressing the first auxiliary soft key 4A while the browser-function icon group $B_{G4}$ is shifted in the right direction by pressing the second auxiliary soft key 4B.

Figure 14E:
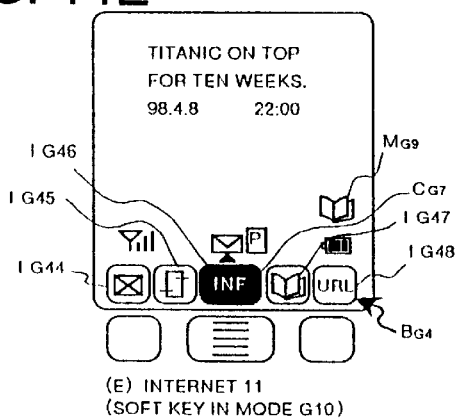
Figure 14C:
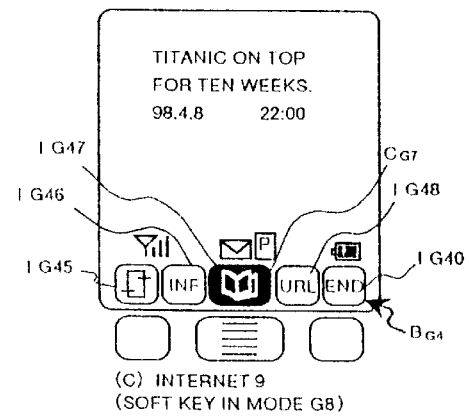

Then, as mode G8 shown in FIG. 14(C), when the icon $I_{G47}$ (bookmark) is positioned at the cursor $C_{G7}$, the user presses the main soft key 3 to select this icon $I_{G47}$. Then the mode is shifted from the mode G8 to a mode G9 shown in FIG. 14(D). In this mode G9, a bookmark $M_{G9}$ indicating that the icon $I_{G47}$ is selected appears on the LCD display screen 2 as shown in FIG. 14(D).

Figure 14F:
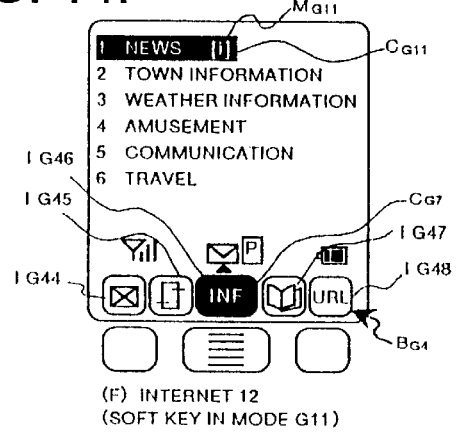

Then the user presses the first auxiliary soft key 4A once to select the icon $I_{G46}$ corresponding to information from the browser-function icon group $B_{G4}$. With this, the mode is shifted from the mode G9 to a mode G10 shown in FIG. 14(E) in which the icon $I_{G46}$ is positioned at the cursor $C_{G7}$. In this mode G10, when the main soft key 3 is pressed by the user, the mode is shifted from the mode G10 to a mode G11 shown in FIG. 14(F). In this mode G11, a bookmark $M_{G11}$, is displayed on the right of the item "1 News" in the sub menu explained with respect to the mode G4 (FIG. 13(E)) on the LCD display screen 2. When information key 21 is pressed during this mode G11 (step SB8), the Internet connection processing is terminated, and the mode is shifted from this mode G11 to the above mentioned initial mode G0.

With the mobile telephone 1 as described above, when the Internet is to be accessed, one-touch operation with the information key 21 allows a connection to the Internet to be established, and most of the main operations can also be realized by rotating and pressing the main soft key 3, and the following operations can be realized by pressing the first auxiliary soft key 4A and the second auxiliary soft key 4B, which allows the usability for a user to significantly be improved.

Figure 16:
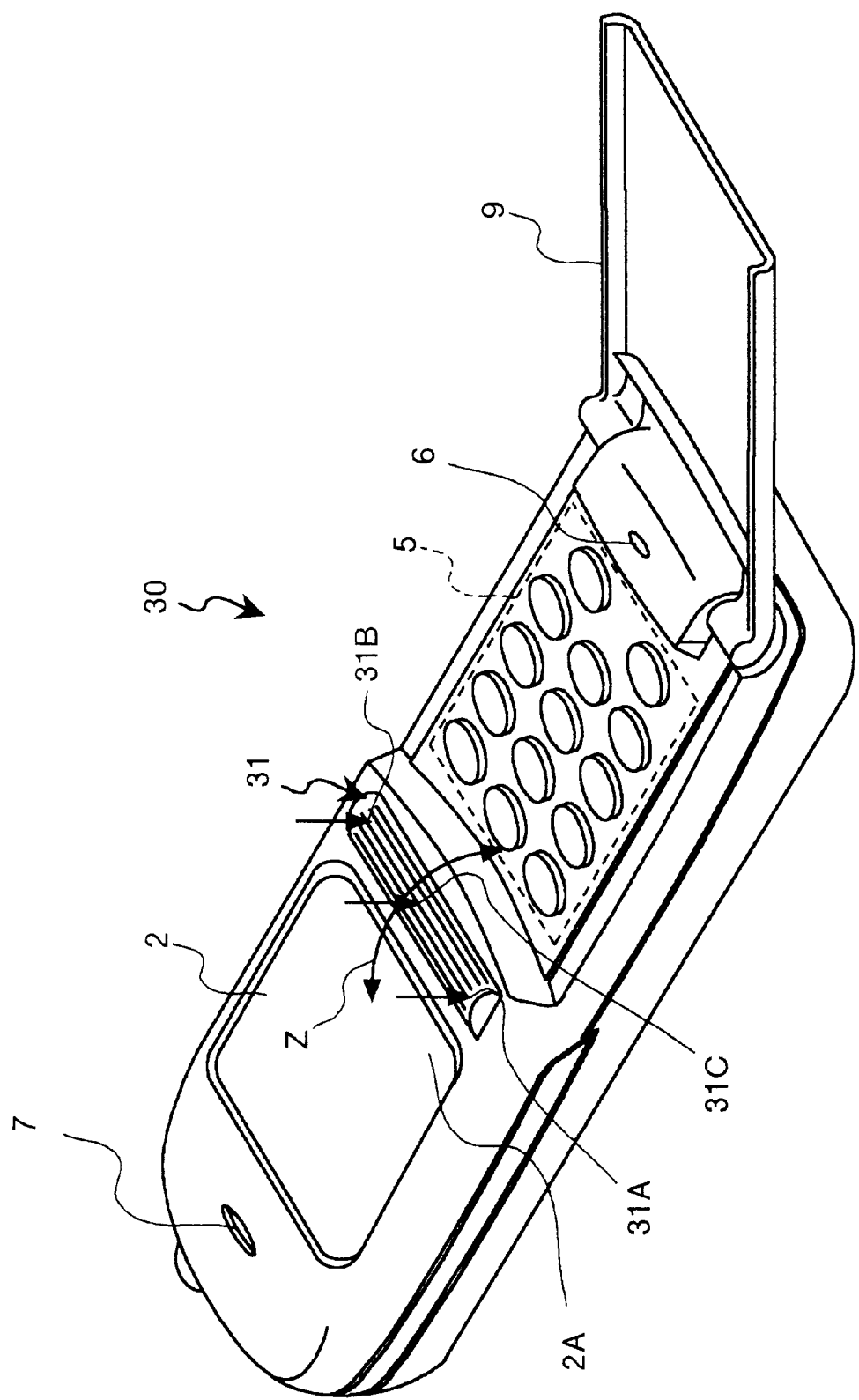
FIG. 16 is a general plan view showing appearance of a mobile telephone 30 which is the portable terminal according to Embodiment 3 of the present invention.
Figure 17:
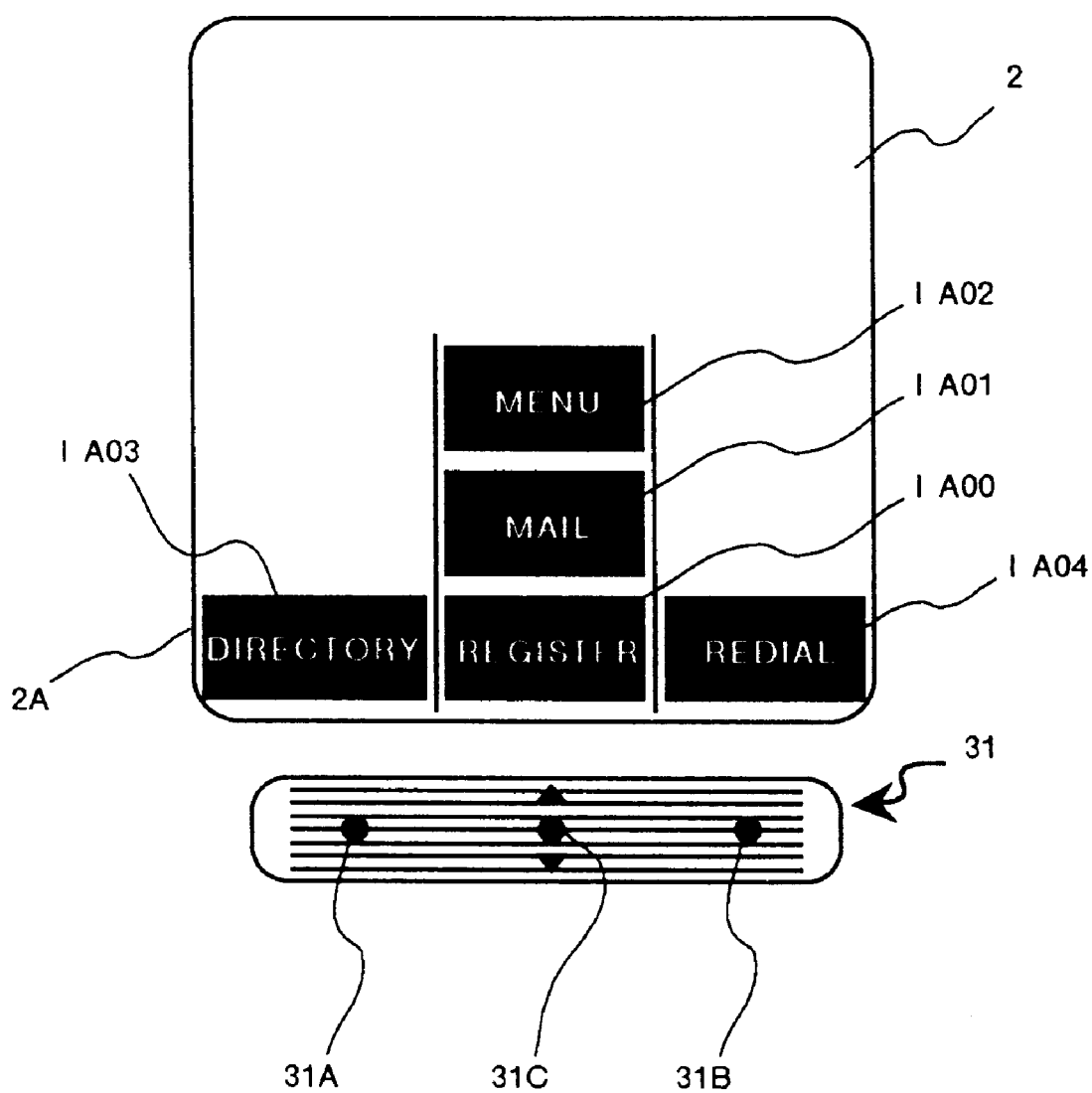
FIG. 17 is an enlarged view showing the configuration adjacent to a single roller soft key 31 in the mobile telephone 30 shown in FIG. 16.
Figure 18:
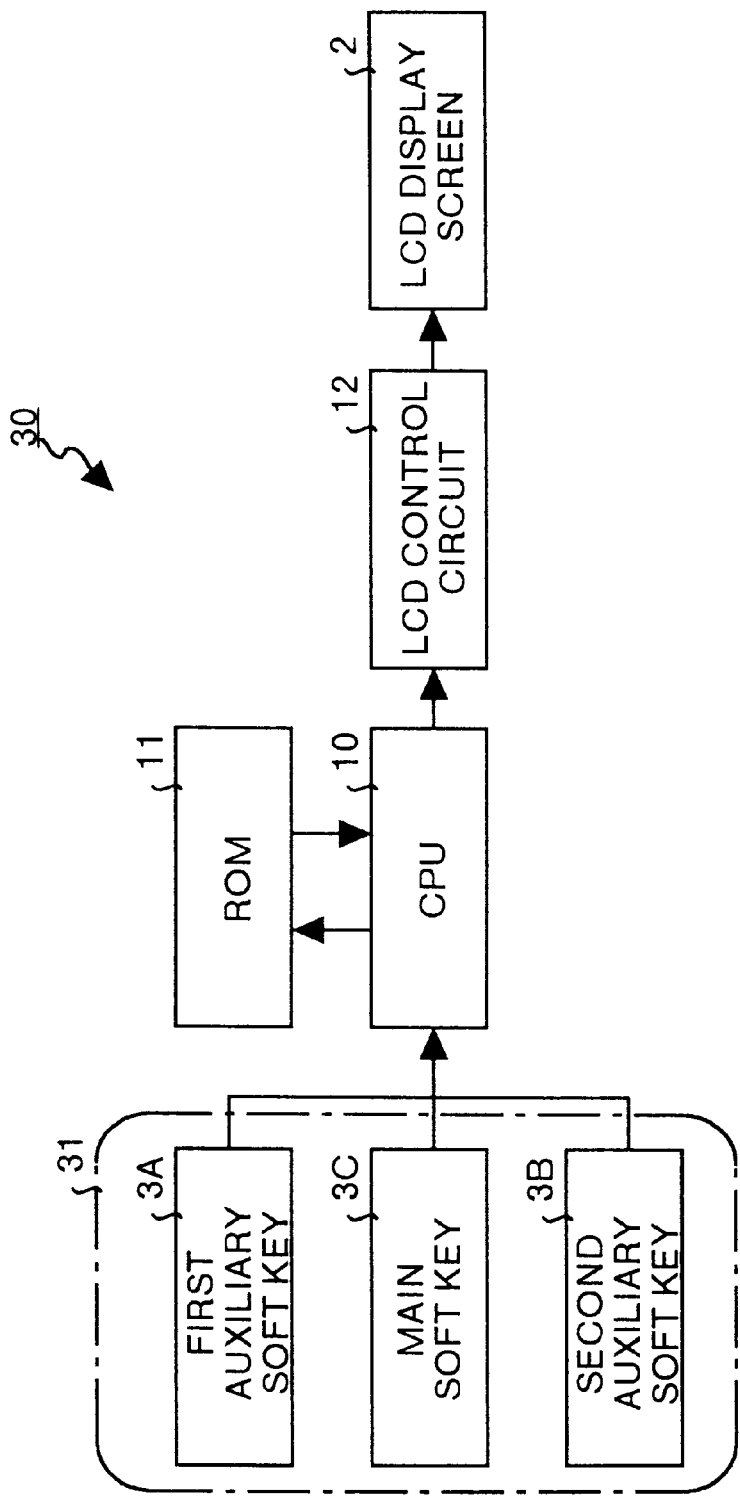
FIG. 18 is a block diagram showing electrical configuration of the key section of the mobile telephone 30 shown in FIG. 16.

FIG. 16 is a perspective view showing external configuration of a mobile telephone 30 as an example of the portable terminal according to Embodiment 3 of the present invention, and shows a state in which the flip 9 is open. FIG. 17 is an enlarged view showing the configuration adjacent to a single roller soft key 31 shown in FIG. 16. FIG. 18 is a block diagram showing electrical configuration of the key section of the mobile telephone 30. In FIGS. 16, 17, and 18, the same reference numerals are assigned to the sections corresponding to those in FIGS. 1, 4(A), and 2, and description thereof is omitted herein. In FIG. 16, a single roller soft key 31 having substantially a cylindrical shape is provided in place of the main soft key 3, first auxiliary soft key 4A and the second auxiliary soft key 4B shown in FIG. 1.

This single roller soft key 31 is a key for realizing each functions of the main soft key 3, the first auxiliary soft key 4A and the second auxiliary soft key 4B (Refer to FIG. 1) as described above by one roller-like body. Namely, the single roller soft key 31 has a single roller body which is rotatably provided below the LCD display screen 2 such that the roller body can be rotated in the Z direction (direction along the circumference of the roller). This single roller soft key 31 can be operated by pressing in the same manner as clicking a mouse button similarly to that of the main soft key 3. In the single roller soft key 31, a main soft key section 31C is a section corresponding to the main soft key 3 (Refer to FIG. 1). A first auxiliary soft key section 31A is a section corresponding to the first auxiliary soft key 4A (Refer to FIG. 1) and a second auxiliary soft key section 31B is a section corresponding to the second auxiliary soft key 4B.

Namely, when power of the mobile telephone 30 shown in FIG. 16 is turned ON, a screen showing an initial mode appears in the soft-key function display area 2A of the LCD display screen 2 as shown in FIG. 17. In this initial mode, icons $I_{A00}$, $I_{A01}$, $I_{A02}$ showing "Register", "Mail", "Menu" respectively are vertically arranged and displayed as functions corresponding to the main soft key section 31C of the single roller soft key 31 in the soft-key function display area 2A. Further, icons $I_{A03}$, $I_{A04}$ showing "Directory" and "Redial" respectively as functions corresponding to the first auxiliary soft key section 31A and the second auxiliary soft key section 31B respectively are arranged and displayed on the two sides of the icon $I_{A00}$ showing "Register".

Accordingly, when a desired icon is selected out of the icons $I_{A00}$, $I_{A01}$, $I_{A02}$, after the single roller soft key 31 is rotated up or down, the main soft key section 31C may be pressed in the same manner as that for the main soft key 3. Similarly, the first auxiliary soft key section 31A may be pressed when the Icon $I_{A03}$ showing "Directory" is to be selected, and the second auxiliary soft key section 31B may be pressed when the Icon $I_{A04}$ showing "Redial" is to be selected. It should be noted that the method of operation with the single roller soft key 31 is the same as that in Embodiments 1 and 2, so that description thereof is omitted herein.

With the mobile telephone 30 as described above, as the functions of the main soft key 3, the first auxiliary soft key 4A and the second auxiliary soft key 4B are provided to the single roller soft key 31 comprising a single roller body, the main and the following operations can be realized by one unit of single roller soft key 31 even when the process of making or receiving of telephone calls, or receiving of emails is to be performed, which allows the usability for a user to dramatically be improved.

Although the present invention has been described with respect to Embodiments 1 to 3 for a complete and clear disclosure, the appended claims are not to be thus limited but are to be construed as embodying all modifications and alternative constructions that may occur to one skilled in the art which fairly fall within the basic teaching herein set forth. For example, in Embodiments 1 to 3, the mobile telephones 1, 20 and 30 have been described as examples of the portable terminal according to the present invention. However, the present invention is not limited to a mobile telephone, and the invention may be applied to a PHS (Personal Handy phone System) terminal or a personal digital assistant having a communication function.

As described above, in the invention, a function having the highest frequency of use is allocated to the main soft key for each communication mode, a function having the next highest frequency of use is allocated to the auxiliary soft key, and marks representing the functions are displayed on the locations corresponding to the main soft key and the auxiliary soft key of the display screen as a main-function icon and an auxiliary-function icon. Thus, a number of entry keys can be reduced and a large-sized entry key with high usability can be provided, which allows downsizing and realization of multi-functional system in the portable terminal. Further, operations can be performed without using the manual, and operability can be improved by an input device (main and auxiliary soft keys) linked to a sense obtained when a scrolling operation is performed on a screen. Accordingly, a multi-functional system can be realized with a minimum number of entry key to achieve downsizing, which allows the usability of the portable terminal for a user to significantly be improved.

In the portable terminal according to another aspect of the present invention, when a plurality of icons are displayed on a display screen as the main-function icon, one of these icons can be selected and confirmed by rotating and pressing the main soft key. Therefore, selection of one icon out of a plurality of icons can be made with an easy operation, and the operability and usability of the portable terminal for a user can further be improved.

In the portable terminal according to another aspect of the present invention, ordinary operations of the main soft key and the auxiliary soft key are carried out while the flip is closed. Therefore, with the portable terminal according to the invention the operability can further significantly be improved.

In the portable terminal according to another aspect of the present invention, functions can be operated by two auxiliary soft keys of the first auxiliary soft key and the second auxiliary soft key. Therefore, more functions can be allocated to the first and second auxiliary soft keys. Accordingly, in the portable terminal according to the invention, the operability is not affected by the fact that a large number of functions are allocated to the keys.

In the portable terminal according to another aspect of the present invention, the functions of the main soft key and first and second auxiliary soft keys are provided to a single soft key. Therefore, three operational functions can be realized with a single key operation so that the operability and usability of the portable terminal can further significantly be improved.

In the portable terminal according to another aspect of the present invention, by operating only the one-touch key a connection with the Internet can be achieved. Further during the Internet connection, a function having the highest frequency of use can be selected by operating the main soft key, and a function having the next highest frequency of use can be selected by operating the auxiliary soft key. Therefore, operability of the portable terminal can significantly be improved even during the Internet connection.

In the portable terminal according to another aspect of the present invention, a plurality of browser icons are displayed on the display screen during the Internet connection. Therefore, one icon can be selected out of the plurality of browser icons by a simple operation with the main soft key, the first or second auxiliary soft keys.

With the portable terminal according to another aspect of the present invention, even when any arbitrary item out of a plurality of items displayed on the display screen is to be selected, the item can be selected only by a simple operation with the main soft key and auxiliary soft key.

In the portable terminal according to another aspect of the present invention, a single soft key having three operational functions is provided therein. Further, marks representing the functions are displayed on locations of the display screen corresponding to the main soft key element and first and second auxiliary soft keys elements as a main-function icon and first and second auxiliary-function icons respectively. Therefore, number of entry keys can be reduced and also an operation with a signal soft key is possible, which allows the operability of the portable device to further significantly be improved.

Industrial Applicability

As described above, the portable terminal according to the present invention is useful to a portable type of communication equipment with a large number of functions provided therein.

What is claimed is:

1. A portable terminal, comprising:

a case;

a display screen located on a first surface of said case, said display screen displaying thereon various information according to an operation mode of said terminal;

a main soft key located on said first surface below said display screen, and a first auxiliary soft key located on said first surface adjacent to said main soft key, wherein said main soft key performs a scrolling operation by being actuated in either of a first and second direction and performs a selection operation by being pressed toward said first surface, and said auxiliary soft key performs at least a selection operation by being pressed toward said first surface; wherein various different functions may be allocated to said main soft key and to said auxiliary soft key through scrolling and selection operations performed on said main soft key and at least selection operations on said auxiliary soft key; and the identity of functions currently allocated to said main soft key and to said auxiliary soft key are displayed in a function display area of said display screen adjacent to said soft keys.

2. A portable terminal as set forth in claim 1, wherein a plurality of functions is allocated to said main soft key and displayed adjacent to said main soft key in said function display area, and a particular one of said plurality of functions is executed by actuation and pressing of said main soft key.

3. A portable terminal as set forth in claim 1, further comprising a second auxiliary soft key located on said first surface adjacent to said main soft key and said first auxiliary soft key, wherein the identity of a function currently allocated to said second auxiliary soft key is displayed in said function display area of said display screen, and functions allocated to said main soft key and to said first auxiliary soft key may be changed by executing a selection operation on said second auxiliary soft key.

4. A portable terminal as set forth in claim 1, wherein said identity of allocated functions are displayed in the form of text.

5. A portable terminal as set forth in claim 1, wherein said identity of allocated functions are displayed in the form of graphical icons.

6. A portable terminal as set forth in claim 5, wherein said graphical icons are Internet browser icons.

7. A portable terminal as set forth in claim 6, further comprising a dedicated one-touch key that when pressed causes information for connecting said portable terminal to the Internet to be displayed on said display screen.

8. A portable terminal as set forth in claim 1, wherein said main soft key is rotatable and performs said scrolling operation by being rotated in either of said first and second directions.

9. A portable terminal, comprising:

a case;

a display screen located on a first surface of said case, said display screen displaying thereon various information according to an operation mode of said terminal;

an elongated soft key located on said first surface below said display screen, wherein said elongated soft key performs a scrolling operation by being actuated in either of first and second directions, performs a main function selection operation by being pressed toward said first surface at a central section thereof, and performs first and second auxiliary function selection operations by being pressed toward said first surface at respective end sections thereof; wherein various different functions may be allocated to said central section and to said end sections of said elongated soft key through scrolling and central and end section selection operations performed thereon; and the identity of functions currently allocated to said central section and to said respective end sections of said elongated soft key are displayed in a function display area of said display screen adjacent to said sections.

10. A portable terminal as set forth in claim 9, wherein a plurality of functions is allocated to said central section of said elongated soft key and displayed adjacent to said central section in said function display area, and a particular one of said plurality of functions is executed by actuattion of said elongated soft key and pressing of said central section.

11. A portable terminal as set forth in claim 9, wherein said identity of allocated functions are displayed in the form of text.

12. A portable terminal as set forth in claim 9, wherein said identity of allocated functions are displayed in the form of graphical icons.

13. A portable terminal as set forth in claim 12, wherein said graphical icons are Internet browser icons.

14. A portable terminal as set forth in claim 9, wherein said elongated soft key is rotatable and performs said scrolling operation by being rotated in either of said first and second directions.

* * * * *